US009303390B2

(12) United States Patent
Nagato et al.

(10) Patent No.: US 9,303,390 B2
(45) Date of Patent: Apr. 5, 2016

(54) WORK MACHINE AND WORK MANAGEMENT SYSTEM

(71) Applicant: Komatsu Ltd., Tokyo (JP)

(72) Inventors: Atsushi Nagato, Fujisawa (JP); Kiyokazu Sagawa, Tokyo (JP); Ryo Sasaki, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/437,505

(22) PCT Filed: Nov. 11, 2013

(86) PCT No.: PCT/JP2013/080471
§ 371 (c)(1),
(2) Date: Apr. 22, 2015

(87) PCT Pub. No.: WO2014/080793
PCT Pub. Date: May 30, 2014

(65) Prior Publication Data
US 2015/0240458 A1 Aug. 27, 2015

(30) Foreign Application Priority Data
Nov. 20, 2012 (JP) ................................ 2012-254756

(51) Int. Cl.
*E02F 9/26* (2006.01)
*E02F 3/43* (2006.01)
(Continued)

(52) U.S. Cl.
CPC . *E02F 9/26* (2013.01); *E02F 3/435* (2013.01); *E02F 9/2054* (2013.01); *E02F 9/264* (2013.01); *E02F 9/267* (2013.01); *G07C 5/085* (2013.01); *G07C 5/10* (2013.01)

(58) Field of Classification Search
USPC ........................................................ 701/32.7
See application file for complete search history.

(56) References Cited

U.S. PATENT DOCUMENTS 7,764,188 B2 * 7/2010 O'Neal .................... G05B 9/03 340/517
8,190,335 B2 * 5/2012 Vik ........................ G07C 5/008 370/245

(Continued)

FOREIGN PATENT DOCUMENTS

JP 2-16417 B2 4/1990
JP 10-306471 A 11/1998

(Continued)

OTHER PUBLICATIONS

International Search Report mailed Feb. 18, 2014, issued for PCT/JP2013/080471.

*Primary Examiner* — Thomas Tarcza
*Assistant Examiner* — Alex C Dunn
(74) *Attorney, Agent, or Firm* — Locke Lord LLP

(57) ABSTRACT

A work machine includes: a work state detection unit detecting a physical amount; a time integration unit calculating a time integration value; a determination unit associating the time integration value with a predetermined operating angle of an excavation-loading mechanism and determining that an operation of an operation lever is performed at a time the time integration value is not smaller than a predetermined integration value; a counting unit performing accumulation adding with number of times of loading as once at a time each operation is an excavation-loading work performed in an order of: an excavation operation; a forward swing operation; a soil discharge operation; and a backward swing operation; a default setting unit setting a bucket capacity; a workload calculation unit calculating a workload by multiplying the number of times of loading by the bucket capacity; and an output unit outputting the workload.

12 Claims, 16 Drawing Sheets

(51) Int. Cl.

| | |
|---|---|
| ***G07C 5/08*** | (2006.01) |
| ***G07C 5/10*** | (2006.01) |
| ***E02F 9/20*** | (2006.01) |

(56) References Cited

U.S. PATENT DOCUMENTS

| | | | | |
|---|---|---|---|---|
| 2007/0142989 | A1* | 6/2007 | Koehrsen | G01S 5/0072 701/50 |
| 2008/0082241 | A1* | 4/2008 | Meiners | A01B 79/005 701/50 |
| 2009/0069987 | A1* | 3/2009 | Omelchenko | E02F 3/842 701/50 |
| 2009/0099738 | A1* | 4/2009 | Danko | B25J 9/1607 701/50 |
| 2013/0030667 | A1* | 1/2013 | Fujimoto | B60W 10/06 701/93 |
| 2013/0282241 | A1* | 10/2013 | Sugiyama | E02F 9/2091 701/50 |
| 2014/0200795 | A1* | 7/2014 | Kawaguchi | F02D 31/008 701/110 |
| 2015/0225927 | A1* | 8/2015 | Hoshino | F02D 29/02 701/50 |

FOREIGN PATENT DOCUMENTS

| | | | |
|---|---|---|---|
| JP | 11-140910 | A | 5/1999 |
| JP | 2000-129727 | A | 5/2000 |
| JP | 2001-003400 | A | 1/2001 |
| JP | 2002-004336 | A | 1/2002 |
| JP | 2006-161864 | A | 6/2006 |

* cited by examiner

WORKING RATE=NUMBER OF TIMES OF LOADING×BUCKET CAPACITY (ACQUIRED WORKING RATE)

SOIL AMOUNT=NUMBER OF DUMP TRUCKS (ACQUIRED WORKING RATE) ×DUMP TRUCK PAYLOAD (ACQUIRED WORKING RATE)

WORK MACHINE AND WORK MANAGEMENT SYSTEM

FIELD

The present invention relates to a work machine and a work management system which can measure the number of times of a series of operations in an excavation-loading mechanism which operations are performed during an excavation-loading work or the like and can perform work management based on a measurement result easily and accurately.

BACKGROUND

Manual measurement of a work amount of a work machine such as an excavator is a burden on an operator or the like and is troublesome, and thus, automation thereof has been proposed.

On the other hand, manually-measured or automatically-measured work amount is preferably used for management. Accordingly, in Patent Literature 1, the number of times of loading is measured by operation of a count switch which operation is performed by an operator and the measured accumulated number of times of loading in one day is displayed on a monitor of an excavator.

CITATION LIST

Patent Literature

Patent Literature 1: Japanese Laid-open Patent Publication No. 2001-3400

SUMMARY

Technical Problem

Incidentally, with respect to excavators of different automobile ranks such as a size, in order to accurately measure the number of times of a series of operations in an excavation-loading mechanism, it is necessary to perform different settings depending on automobile ranks, and thus, general versatility is lacked. The series of operations is, for example, an excavation-loading work in which excavation, a forward swing, soil discharge, and a backward swing are serially and repeatedly performed.

Also, in measurement of the number of times of a series of excavation-loading work (hereinafter, referred to as number of times of loading) with high accuracy, work amount measurement with high accuracy is eventually realized. This is preferable with respect to work management of a work machine or a work site and can realize more effective work management.

This invention is provided in view of the forgoing and a purpose thereof is to provide a work machine and a work management system which can measure the number of times of a series of operations, such as a loading work, in an excavation-loading mechanism and can perform work management based on a measurement result.

Solution to Problem

To solve the above-described problem and achieve the object, a work machine according to the present invention includes: a work state detection unit configured to detect a physical amount output in response to an operation of an operation lever; a time integration unit configured to calculate a time integration value by performing time-integration of the physical amount; a determination unit configured to associate the time integration value with a predetermined operating angle of an excavation-loading mechanism, the operation angle being associated with the operation of the operation lever and to determine that the operation of the operation lever is performed at a time the time integration value is not smaller than a predetermined integration value; a counting unit configured to perform accumulation adding with number of times of loading as once at a time each operation, of the excavation-loading mechanism, determined by the determination unit is an excavation-loading work performed in an order of: an excavation operation; a forward swing operation; a soil discharge operation; and a backward swing operation; a default setting unit configured to set a bucket capacity; a workload calculation unit configured to calculate a workload by multiplying the number of times of loading by the bucket capacity; and an output unit configured to at least output the workload.

Moreover, in the above-described work machine according to the present invention, the default setting unit is configured to further set a default including number of a collectors and a payload of a collector, and the work machine further includes: a soil amount calculation unit configured to calculate a soil amount by multiplying the number of collectors by the payload of the collector; a working rate calculation unit configured to calculate a working rate based on the workload and the soil amount; and an output unit configured to at least output the working rate.

Moreover, in the above-described work machine according to the present invention, the counting unit is configured to measure basic excavation and loading time which is time necessary for a series of excavation-loading work on which time accumulation adding is performed, and the output unit is configured to output operation time of the work machine including the basic excavation and loading time.

Moreover, in the above-described work machine according to the present invention, the output unit is configured to output the number of times of loading.

Moreover, the above-described work machine according to the present invention further includes a setting changing unit configured to change various set values necessary for determination of the series of excavation-loading work, and the setting changing unit can change various set values.

Moreover, in the above-described work machine according to the present invention, various set values are values previously calculated by a teaching operation.

Moreover, the above-described work machine according to the present invention further includes an operator identification unit configured to perform individual authentication of an operator, and a storage unit configured to associate operator identification information with number of times of loading of each operator and store the operator identification information associated with the number of times of loading of each operator.

Moreover, in the above-described work machine according to the present invention, the operation lever is a pilot type or an electric type, and the physical amount is a pilot pressure or an electric signal.

Moreover, a work management system according to the present invention includes: at least one work machine including: a work state detection unit configured to detect a physical amount output in response to an operation of an operation lever; a time integration unit configured to calculate a time integration value by performing time-integration of the physical amount; a determination unit configured to associate the time integration value with a predetermined operating angle of an excavation-loading mechanism, the operation angle being associated with the operation of the operation lever and to determine that the operation of the operation lever is performed at a time the time integration value is not smaller than a predetermined integration value; a counting unit configured to perform accumulation adding with number of times of loading as once at a time each operation, of the excavation-loading mechanism, determined by the determination unit is an excavation-loading work performed in an order of: an excavation operation; a forward swing operation; a soil discharge operation; and a backward swing operation and also configured to measure basic excavation and loading time which is time necessary for a series of excavation-loading work on which time accumulation adding is performed; and a work machine-side communication unit configured to communicate with a server side and to at least output the number of times of loading and the basic excavation and loading time; and a server including: a default setting unit configured to set a bucket capacity; a workload calculation unit configured to calculate a workload by multiplying the number of times of loading by the bucket capacity; an output unit configured to at least perform a display output of the workload; and a server-side communication unit configured to communicate with the at least one work machine.

Moreover, in the above-described work management system according to the present invention, the default setting unit is configured to further set a default including number of collectors and a payload of a collector, and the work management system further includes: a soil amount calculation unit configured to calculate a soil amount by multiplying the number of collectors by the payload of the collector; a working rate calculation unit configured to calculate a working rate based on the workload and the soil amount; and an output unit configured to at least perform a display output of the working rate.

Moreover, in the above-described work management system according to the present invention, the working rate calculated by the working rate calculation unit is displayed on a display apparatus of a terminal which can access the server, and at least one of a daily working rate of a specific work machine, a working rate of each operator, a working rate of each of a plurality of work machines, and a working rate of each construction site is displayed as the working rate.

Moreover, in the above-described work management system according to the present invention, the basic excavation and loading time output from the work machine-side communication unit with respect to at least one of a specific work machine in each day, each operator, each of a plurality of work machines, and each construction site is displayed on a display apparatus of a terminal which can access the server.

According to the present invention, a work machine includes a default setting unit to set a bucket capacity and a workload calculation unit to calculate a workload which is the number of times of loading multiplied by the bucket capacity and an output unit at least outputs the workload. The work machine calculates a time integration value by performing time integration of a physical amount output in response to an operation of an operation lever, determines that an operation of the operation lever is performed when the time integration value and a predetermined operating angle of an excavation-loading mechanism, which angle is associated with an operation of the operation lever, are made to correspond to each other and when the time integration value becomes equal to or larger than a predetermined integration value, and performs accumulation adding with the number of times of loading as once when the determined operations in the excavation-loading mechanism are performed in a predetermined order. As a result, it is possible to measure the number of times of a series of operations, such as an excavation-loading work, in the excavation-loading mechanism and to perform work management based on a measurement result easily and accurately.

BRIEF DESCRIPTION OF DRAWINGS

FIG. 17-1 is a block diagram illustrating a configuration of a management server.

FIG. 17-2 is a block diagram illustrating a configuration of a work management server.

DESCRIPTION OF EMBODIMENTS

In the following, an embodiment of this invention will be described with reference to the attached drawings.

[Whole Configuration]

Figure 1:
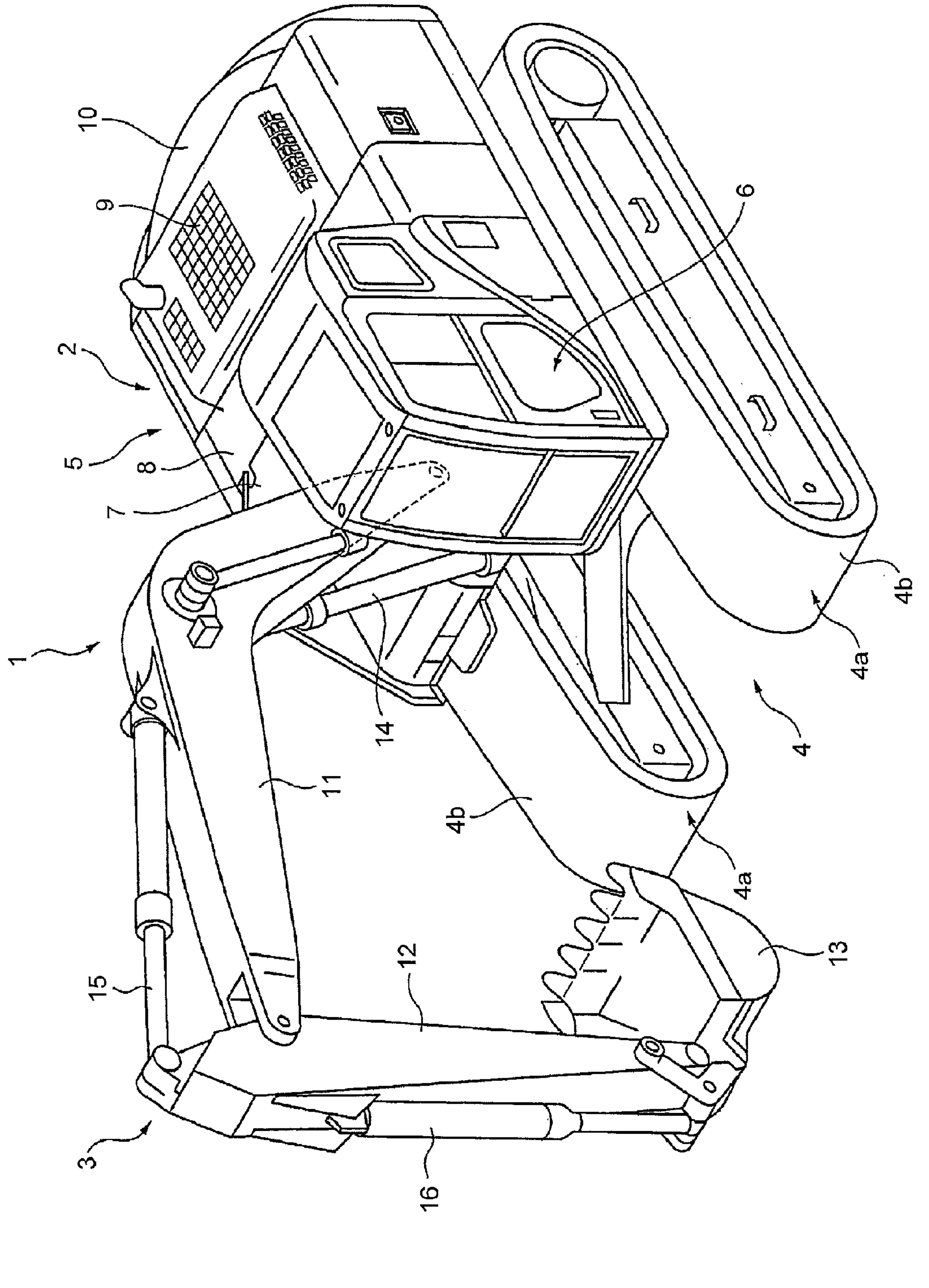
FIG. 1 is a perspective view illustrating an outline configuration of an excavator which is an embodiment of this invention.
Figure 2:
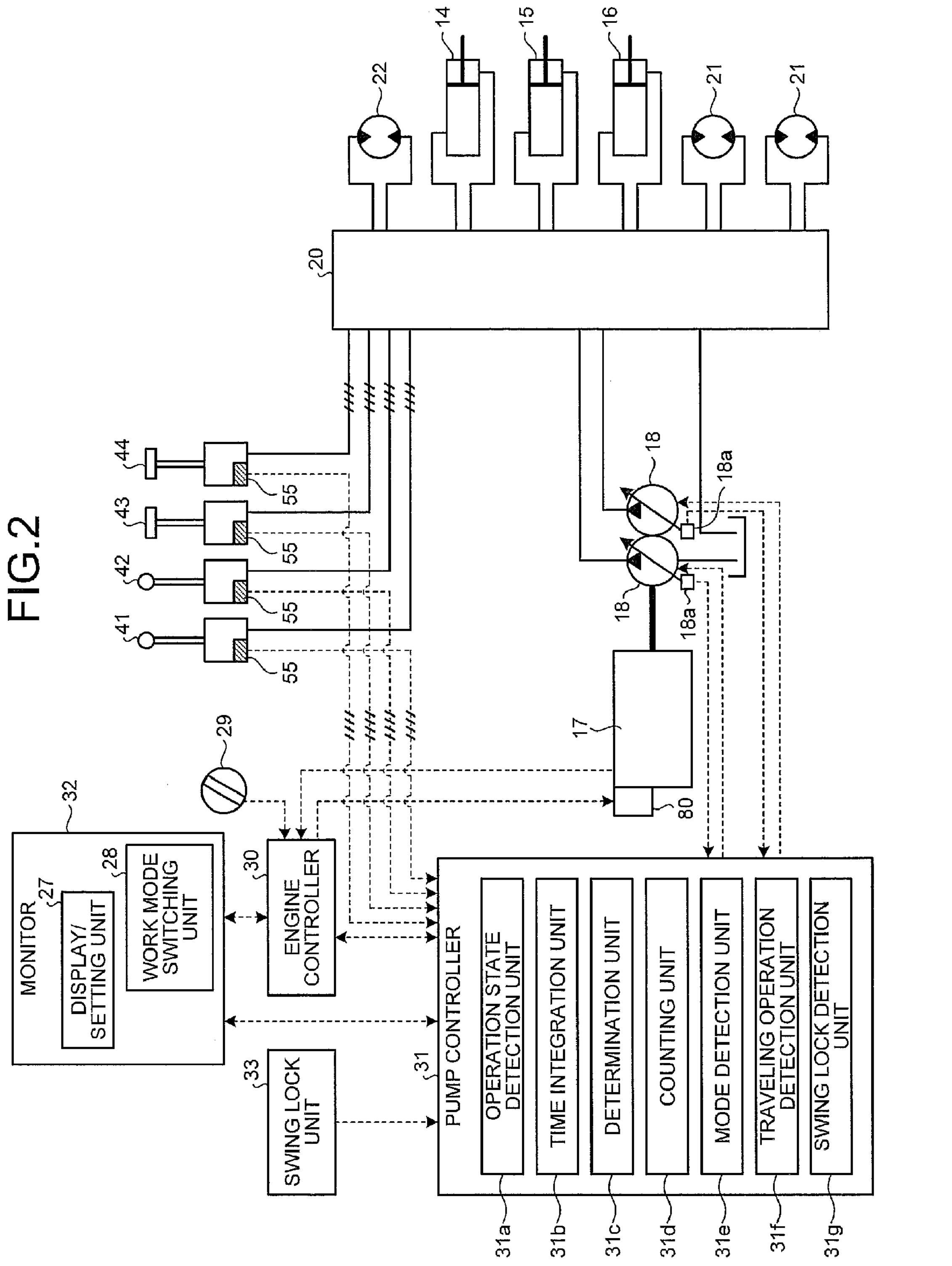
FIG. 2 is a block diagram illustrating a configuration of the excavator illustrated in FIG. 1.

First, each of FIG. 1 and FIG. 2 illustrates a whole configuration of an excavator 1 which is an example of a work machine. The excavator 1 includes a vehicle body 2 and a work device 3. The vehicle body 2 includes a lower traveling body 4 and an upper swing body 5. The lower traveling body 4 includes a pair of traveling apparatuses 4*a*. Each traveling apparatus 4*a* includes a crawler track 4*b*. Each traveling apparatus 4*a* makes the excavator 1 travel or swing by driving the crawler track 4*b* with a right hydraulic traveling motor and a left hydraulic traveling motor (hydraulic traveling motor 21).

The upper swing body 5 is provided on the lower traveling body 4 in a swingable manner and swings when a swing hydraulic motor 22 is driven. Also, in the upper swing body 5, an operation room 6 is provided. The upper swing body 5 includes a fuel tank 7, a hydraulic oil tank 8, an engine compartment 9, and a counterweight 10. The fuel tank 7 stores fuel to drive an engine 17. The hydraulic oil tank 8 stores hydraulic oil discharged from a hydraulic pump 18 to a hydraulic cylinder such as a boom cylinder 14 or a hydraulic device such as a swing hydraulic motor 22 or a hydraulic traveling motor 21. The engine compartment 9 houses a device such as the engine 17 or the hydraulic pump 18. The counterweight 10 is arranged behind the engine compartment 9.

The work device 3 is attached to a center position in a front part of the upper swing body 5 and includes a boom 11, an arm 12, a bucket 13, a boom cylinder 14, an arm cylinder 15, and a bucket cylinder 16. A base end of the boom 11 is rotatably coupled to the upper swing body 5. Also, a leading end of the boom 11 is rotatably coupled to a base end of the arm 12. A leading end of the arm 12 is rotatably coupled to the bucket 13. The boom cylinder 14, the arm cylinder 15, and the bucket cylinder 16 are hydraulic cylinders driven by the hydraulic oil discharged from the hydraulic pump 18. The boom cylinder 14 makes the boom 11 operate. The arm cylinder 15 makes the arm 12 operate. The bucket cylinder 16 is coupled to the bucket 13 through a link member and can make the bucket 13 operate. A cylinder rod of the bucket cylinder 16 performs an extension/contraction operation, whereby the bucket 13 is operated. That is, in a case of excavating and scooping soil with the bucket 13, the cylinder rod of the bucket cylinder 16 is extended and the bucket 13 is rotated and operated from a front side of the excavator 1 to a rear side thereof. Then, in a case of discharging the scoped soil, the cylinder rod of the bucket cylinder 16 is contracted and the bucket 13 is rotated and operated from the rear side of the excavator 1 to the front side thereof.

In FIG. 2, the excavator 1 includes the engine 17 and the hydraulic pump 18 as driving sources. A diesel engine is used as the engine 17 and a variable displacement hydraulic pump (such as swash plate hydraulic pump) is used as the hydraulic pump 18. To an output shaft of the engine 17, the hydraulic pump 18 is mechanically joined. When the engine 17 is driven, the hydraulic pump 18 is driven.

The hydraulic drive system drives the boom cylinder 14, the arm cylinder 15, the bucket cylinder 16, and the swing hydraulic motor 22 according to an operation of operation levers 41 and 42 provided in the operation room 6 in the vehicle body 2. Also, according to an operation of traveling levers 43 and 44, the hydraulic traveling motor 21 is driven. The operation levers 41 and 42 are arranged on a right side and a left side of an operator seat (not illustrated) in the operation room 6 and the traveling levers 43 and 44 are arranged side by side on a front side of the operator seat. The operation levers 41 and 42 and the traveling levers 43 and 44 are pilot levers. According to an operation of each lever, a pilot pressure is generated. A magnitude of a pilot pressure of each of the operation levers 41 and 42 and the traveling levers 43 and 44 is detected by a pressure sensor 55 and an output voltage corresponding to a magnitude of the pilot pressure is output as an electric signal. An electric signal corresponding to the pilot pressure detected by the pressure sensor 55 is transmitted to a pump controller 31. The pilot pressure from each of the operation levers 41 and 42 is input into a control valve 20 and controls an opening of a main valve which connects the hydraulic pump 18 with the boom cylinder 14, the arm cylinder 15, the bucket cylinder 16, and the swing hydraulic motor 22 in the control valve 20. On the other hand, the pilot pressure from each of the traveling levers 43 and 44 is input into the control valve 20 and controls an opening of a main valve which connects a corresponding hydraulic traveling motor 21 and hydraulic pump 18 with each other.

In the operation room 6, a fuel adjustment dial 29, a monitor 32, and a swing lock unit 33 are provided. These are placed near the operator seat in the operation room 6 and are arranged at places where an operation can be easily performed by an operator. The fuel adjustment dial 29 is a dial (setting device) to set an amount of fuel supply to the engine 17. A set value of the fuel adjustment dial 29 is converted into an electric signal and is output to an engine controller 30. Note that by embedding the fuel adjustment dial 29 into a display/setting unit 27 of the monitor 32 and by operating the display/setting unit 27, the amount of fuel supply may be set. The monitor 32 includes the display/setting unit 27 which is a display apparatus and which performs various kinds of displaying and setting. Also, the monitor 32 includes a work mode switching unit 28. The display/setting unit 27 or the work mode switching unit 28 includes, for example, a liquid crystal panel and a switch. Also, the display/setting unit 27 or the work mode switching unit 28 may be configured as a touch panel. As work modes switched by the work mode switching unit 28, there are, for example, a P mode (power mode), an E mode (economy mode), an L mode (arm crane mode=suspension load mode), a B mode (breaker mode), and an ATT mode (attachment mode). The P mode or the E mode is a mode to perform, for example, normal work such as excavation or loading. In the E mode, an output from the engine 17 is controlled compared to the P mode. The L mode is a mode switching to which is performed when a hook (not illustrated) is attached, for example, to an attachment pin to couple the bucket 13 and the link member and an arm crane operation (suspension loading work) to lift a load suspended from the hook is performed. The L mode is a fine work mode in which control is performed in such a manner that the engine speed is controlled and an output from the engine 17 is kept constant and in which the work device 3 can be moved slowly. The B mode is a mode switching to which is performed in a case of performing an operation by attaching, as an attachment, a breaker to crush a rock or the like instead of the bucket 13. Also, the B mode is a mode in which control is performed in such a manner that the engine speed is controlled and an output from the engine 17 is kept constant. The ATT mode is an auxiliary mode switching to which is performed when a special attachment such as a crusher is attached instead of the bucket 13. Also, the ATT mode is a mode in which control of a hydraulic device is performed and a discharge rate of hydraulic oil from the hydraulic pump 18 is controlled, for example. A work mode signal generated by an operation of the work mode switching unit 28 performed by an operator is transmitted to the engine controller 30 and the pump controller 31. Also, the swing lock unit 33 is a switch to turn on/off a swing parking brake (not illustrated). The swing parking brake is to brake the swing hydraulic motor 22 and to prevent the upper swing body 5 from swinging. By an operation of the swing lock unit 33, an electromagnetic solenoid (not illustrated) is driven and a brake to press a rotational part of the swing hydraulic motor 22 along with movement of the electromagnetic solenoid is operated. A monitor input of an ON/OFF signal of the swing parking brake in the swing lock unit 33 is also performed into the pump controller 31.

The engine controller 30 includes a calculation processor such as a CPU (numeric value calculation processor) and a memory (storage apparatus). To the engine 17, a fuel injection apparatus 80 is attached. For example, as the fuel injection apparatus 80, a common-rail type fuel injection apparatus is used. Based on a set value of the fuel adjustment dial 29, the engine controller 30 generates a signal of a control command, transmits a signal to the fuel injection apparatus 80, and adjusts an amount of fuel injection to the engine 17.

The pump controller 31 receives a signal transmitted from each of the engine controller 30, the monitor 32, the operation levers 41 and 42, and the traveling levers 43 and 44 and generates a signal of a control command to perform tilt control of a swash plate angle of the hydraulic pump 18 and to adjust a discharge rate of the hydraulic oil from the hydraulic pump 18. Note that to the pump controller 31, a signal from a swash plate angle sensor 18*a* to detect a swash plate angle of the hydraulic pump 18 is input. The swash plate angle sensor 18*a* detects the swash plate angle, whereby a pump capacity of the hydraulic pump 18 can be calculated.

Also, the pump controller 31 receives a signal transmitted from each of the monitor 32, the pressure sensors 55 attached to the operation levers 41 and 42 and the traveling levers 43 and 44, and the swing lock unit 33. Then, the pump controller 31 performs processing to measure a work amount of the excavator 1. More specifically, processing to calculate the number of times of excavation-loading work (hereinafter, referred to as number of times of loading) and the basic excavation and loading time which become a base of the measurement of the work amount is performed. Details of the number of times of loading and the basic excavation and loading time will be described later.

The pump controller 31 includes an operation state detection unit 31*a*, a time integration unit 31*b*, a determination unit 31*c*, a counting unit 31*d*, a mode detection unit 31*e*, a traveling operation detection unit 31*f*, and a swing lock detection unit 31*g*. The operation state detection unit 31*a* receives a signal output from the pressure sensor 55 and detects a pilot pressure which is a physical amount output in response to an operation of the operation levers 41 and 42. In this embodiment, a pilot pressure to drive the bucket cylinder 16 and the swing hydraulic motor 22 is detected in order to detect that the excavation-loading work is performed. Note that in this embodiment, it is assumed that a physical amount output in response to an operation of the operation levers 41 and 42 is a pilot pressure. This is because the operation levers 41 and 42 are pilot levers. When the operation levers 41 and 42 are electric levers, a physical amount becomes an electric signal, such as voltage, output from a potentiometer or a rotary encoder. Also, instead of detecting the pilot pressure, a stroke amount of each cylinder may be directly detected by a stroke sensor, such as a rotary encoder, attached to a cylinder rod of each of the boom cylinder 14, the arm cylinder 15, and the bucket cylinder 16 and the detected data may be treated as a physical amount output in response to an operation of the operation levers 41 and 42. Alternatively, a stroke amount of a spool may be detected by using a stroke sensor to detect an operation amount of a spool of a valve and the detected data may be treated as a physical amount output in response to an operation of the operation levers 41 and 42. Also, a flow sensor to detect a flow rate of the hydraulic oil from the main valve may be used and the flow rate may be assumed as a physical amount. Moreover, an angle sensor may be provided to each rotation shaft of the work device 3 such as the boom 11, the arm 12, or the bucket 13 and an angle sensor to detect an angle of the upper swing body 5 is provided. By each angle sensor, operating angles of the work device 3 and the upper swing body 5 may be directly detected. Data of the detected operating angles of the work device 3 and the upper swing body 5 may be treated as a physical amount output in response to the operation of the operation levers 41 and 42. Note that in the following, the bucket 13 and the upper swing body 5 will be referred to as an excavation-loading mechanism.

The time integration unit 31*b* calculates a time integration value by performing time integration of a pilot pressure. The determination unit 31*c* associates the time integration value with a predetermined operating angle of the excavation-loading mechanism, which angle is associated with an operation of the operation levers 41 and 42, and determines that an operation of the operation levers 41 and 42 is performed when the time integration value becomes equal to or larger than a predetermined integration value. When operations, which are determined by the determination unit 31*c*, of the excavation-loading mechanism are performed in a predetermined order, the counting unit 31*d* counts the number of times of operations in the excavation-loading mechanism (number of time of excavation-loading work, that is, number of times of loading) with operations, which are in the excavation-loading mechanism and are performed in the predetermined order, as once. The series of operations in the excavation-loading mechanism is an excavation-loading work and is an operation performed in an order of excavation, a forward swing, soil discharge, and a backward swing. The operation performed in such an order is assumed as a pattern of the excavation-loading work and the number of times of performance of the pattern is counted as the number of times of loading. A detail of the excavation-loading work will be described later.

The mode detection unit 31*e* detects a work mode switching to which is instructed by the work mode switching unit 28. The traveling operation detection unit 31*f* determines whether a traveling operation with the traveling levers 43 and 44 is performed based on a signal indicating a pilot pressure output from the pressure sensor 55. The swing lock detection unit 31*g* detects whether the swing lock unit 33 makes a swing lock turned on. Note that the operation state detection unit 31*a* detects whether the pressure sensor 55 to detect the pilot pressure is in an abnormal state. The abnormal state is, for example, a case where an abnormal voltage value which is not in a range of a normal voltage value is output for a several seconds as a value of the output voltage in the pressure sensor 55. Thus, disconnection of the pressure sensor 55 also becomes the abnormal state.

Figure 3:
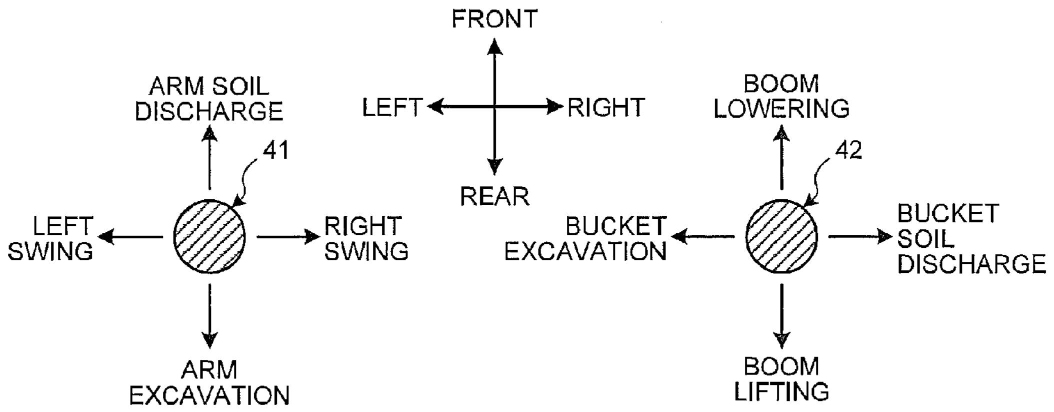
FIG. 3 is a description view illustrating a relationship between an operation direction of an operation lever and movement of a work device or an upper swing body.

As described above, the operation levers 41 and 42 are arranged on right and left sides of the operator seat (not illustrated) in the operation room 6, the operation lever 41 being arranged on a left hand side when an operator sits on the operator seat and the operation lever 42 being arranged on a right hand side which is the opposite side thereof. Note that as illustrated in FIG. 3, when the operation lever 41 is tilted to the right side and the left side in the drawing, it is possible to drive the swing hydraulic motor 22 and to perform a left swing and a right swing of the upper swing body 5. Also, when the operation lever 41 is tilted forward/backward (upward/downward) in the drawing, it is possible to make the arm cylinder 15 perform an extension/contraction drive and to perform arm soil discharge and arm excavation. The arm soil discharge is an operation performed when a leading end of the arm 12 is rotated and moved from a rear side of the excavator 1 to a front side thereof and when soil stored in the bucket 13 is discharged. Also, the arm excavation is an operation performed when the leading end of the arm 12 is rotated and moved from the front side of the excavator 1 to the rear side thereof and when soil is scooped by the bucket 13. On the other hand, when the operation lever 42 is tilted to the right side and the left side in the drawing, it is possible to drive the bucket cylinder 16 and to perform bucket excavation and bucket soil discharge. Also, when the operation lever 42 is tilted forward/backward (upward/downward) in the drawing, it is possible to drive the boom cylinder 14 and to lower and to lift a boom. Note that the operation levers 41 and 42 can be tilted in whole circumference. Thus, a combined operation can be performed by one lever operation. For example, it is possible to perform an operation of arm soil discharge while performing a left swing. Note that with the traveling lever 43, it is possible to perform right forward traveling and right backward traveling according to an operation. Also, with the traveling lever 44, it is possible to perform left forward traveling and left backward traveling according to an operation. That is, when only the traveling lever 43 is operated, a crawler track 4*b* on a right side is driven. When only the traveling lever 44 is operated, a crawler track 4*b* on a left side is driven. When the traveling levers 43 and 44 are operated simultaneously, the crawler tracks 4*b* on the right side and the left side are driven simultaneously. Note that a relationship between an operation direction of the operation lever and movement of the work device 3 or the upper swing body 5 which relationship is illustrated in FIG. 3 is an example. Thus, a relationship between the operation direction of the operation lever and movement of the work device 3 or the upper swing body 5 may be different from what is illustrated in FIG. 3.

[Measurement Processing of Number of Times of Loading in Excavation-Loading Work]

Figure 4:
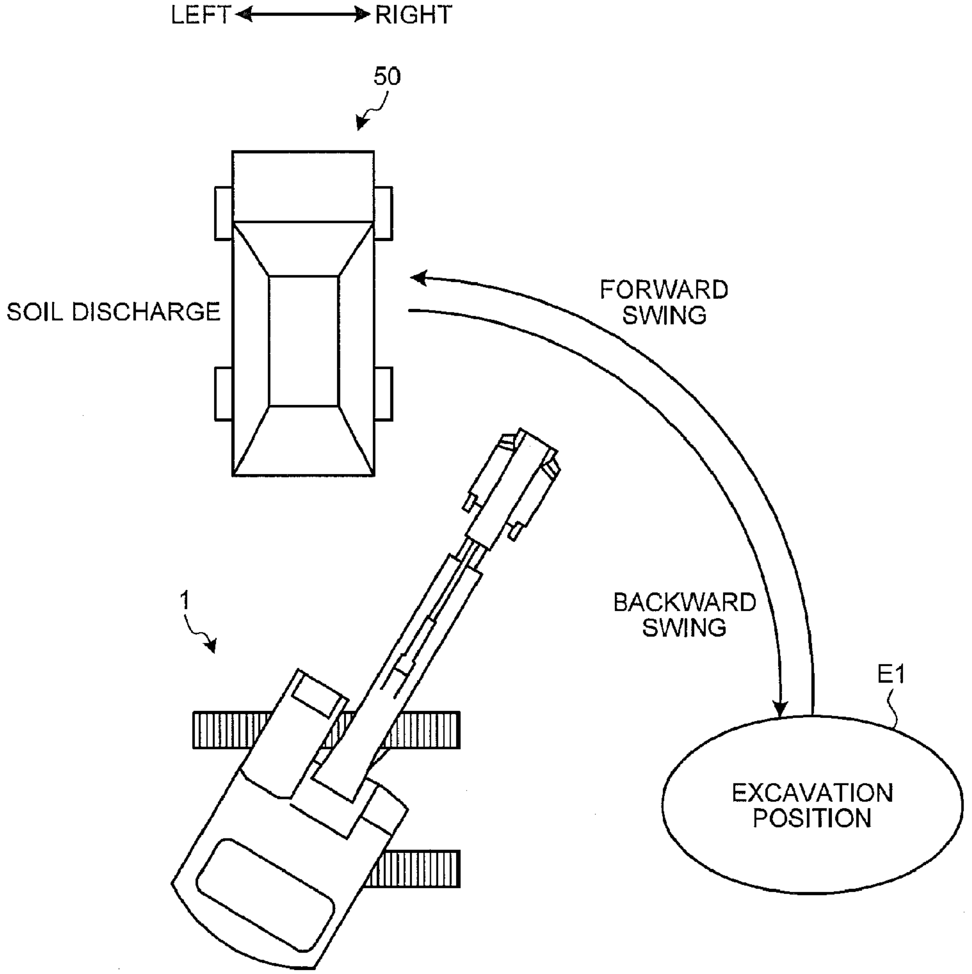
FIG. 4 is a description view for describing an excavation-loading work by the excavator.
Figure 5:
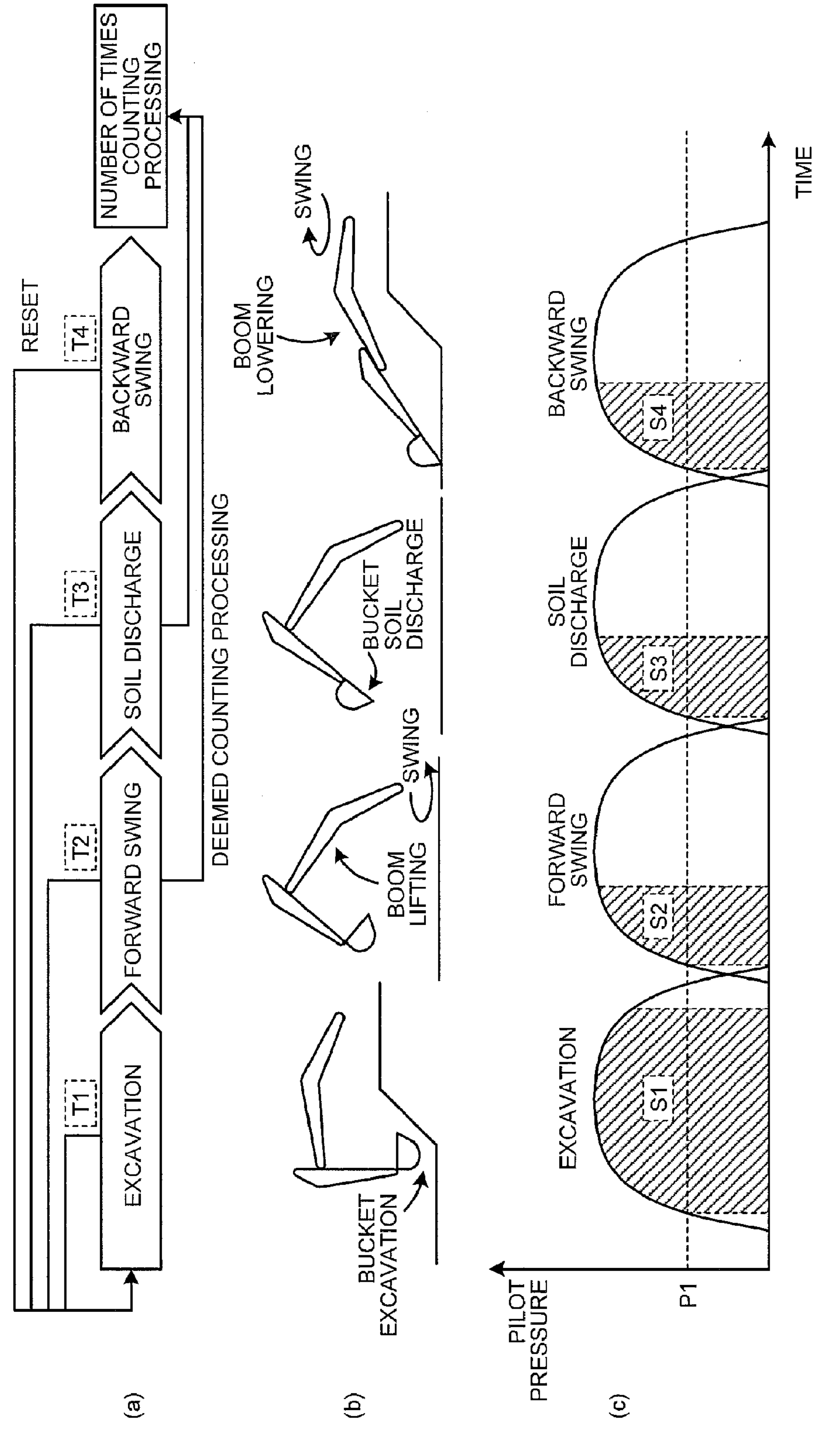
FIG. 5 is a time chart for describing counting processing of the number of times of loading.

First, with reference to FIG. 4 and FIG. 5, an excavation-loading work by the excavator 1 will be described. FIG. 4 is a view illustrating a case where a dump truck 50 stands by on a left side of the excavator 1. That is, a case where the dump truck 50 stands by on a side close to the operation room 6 when the excavator 1 faces a direction of an excavation position E1 is illustrated. As illustrated in FIG. 4, FIG. 5(*a*), and FIG. 5(*b*), the excavation-loading work is a series of operations performed in an order of excavation, a forward swing, soil discharge, and a backward swing. In the excavation, the operation lever 42 is tilted to the left and soil is excavated by the bucket 13 at the excavation position E1. In a case of FIG. 4, in the forward swing, the operation lever 41 is tilted to the left to a position of the dump truck 50 which transports loaded soil or the like. Then, the operation lever 42 is tilted to a rear side and the upper swing body 5 is made to perform a left swing while lifting the boom 11. In the soil discharge, the operation lever 42 is tilted to the right and soil or the like scooped by the bucket 13 is discharged at the position of the dump truck 50. In a case of FIG. 4, in the backward swing, the operation lever 41 is tilted to the right from the position of the dump truck 50 to the excavation position E1. Then, the operation lever 42 is tilted to a front side and the upper swing body 5 is made to perform a right swing while lowering the boom 11. Note that when the excavation position E1 is placed on the left side of the dump truck 50, the forward swing is the right swing and the backward swing is the left swing. This case is a case where the dump truck 50 stands by on an opposite side of the operation room 6 when the excavator 1 faces a direction of the excavation position E1. That is, the forward swing is an operation to perform a swing from the excavation position E1 to the soil discharge position of the dump truck 50 and the backward swing is an operation to perform a swing from the soil discharge position to the excavation position E1.

[Basic Measurement Processing of Number of Times of Loading]

In a case of measuring the number of times of loading, it is necessary to accurately detect performance an operation of each of excavation, a forward swing, soil discharge, and a backward swing. Thus, in this embodiment, as described above, a time integration value which is a pilot pressure time-integrated by the time integration unit 31*b* and a predetermined operating angle, which is associated with an operation of the operation levers 41 and 42, of the bucket 13 and the upper swing body 5 which are the excavation-loading mechanism are associated with each other. When the time integration value becomes equal or larger than the predetermined integration value, it is determined that an operation such as excavation by the operation levers 41 and 42 is performed. That is, performance of each operation (excavation, forward swing, soil discharge, or backward swing) in the excavation-loading work is determined by using a time integration value of the pilot pressure. The determination is made depending on whether the calculated time integration value is equal to or larger than the predetermined integration value. The predetermined integration value corresponds to a case where the excavation-loading mechanism which is the bucket 13 or the upper swing body 5 moves only at a predetermined angle along with each operation. The predetermined angle, that is, the predetermined operating angle corresponds to an angle at which the excavation-loading mechanism operates when each operation is performed. With respect to the bucket 13, an angle corresponding to movement of the bucket 13 of when an operation of excavation or soil discharge is performed is the predetermined operating angle. With respect to the upper swing body 5, an angle corresponding to movement of a swing during the excavation-loading work is the predetermined operating angle. The predetermined operating angle is an identical value even when the excavators 1 are in different automobile ranks. A time integration value corresponding to the predetermined operating angle varies depending on an automobile rank. Thus, even in the excavator 1 of a different automobile rank, the number of times of loading of each automobile rank can be measured as long as correspondence between a time integration value, which is a time-integrated pilot pressure and which is calculated for each automobile rank by the time integration unit 31*b*, and a predetermined operating angle of the excavation-loading mechanism which angle is associated with an operation of the operation levers 41 and 42 is set.

For example, in the excavation, as illustrated in FIG. 5(*c*), a pilot pressure generated when the operation lever 42 is tilted to the left to move the bucket 13 is detected. When the pilot pressure becomes equal to or higher than an integration starting pressure P1, time integration of the pilot pressure is started. At a point at which the time integration value becomes equal to or larger than S1, it is determined that the excavation operation is performed. The time integration value S1 is an excavation time integration value S1 and corresponds to a predetermined operating angle of the bucket 13 in a case where the excavation is performed. With respect to an operation such as a forward swing, soil discharge, or a backward swing, time integration of each pilot pressure is started when each pilot pressure becomes equal to or higher than the integration starting pressure P1. With respect to the forward swing and the backward swing, a pilot pressure generated when the operation lever 41 is tilted to the left or right is detected and a time integration value S2 or S4 is calculated. With respect to the soil discharge, a pilot pressure generated when the operation lever 42 is tilted to the right is detected and a time integration value S3 is calculated. The time integration value S2 of the forward swing, the time integration value S3 of the soil discharge, and the time integration value S4 of the backward swing respectively correspond to the predetermined operating angles of the upper swing body 5, the bucket 13, and the upper swing body 5. Acquisition of the time integration values S1 to S4 by the time integration unit 31*b* means that the bucket 13 or the upper swing body 5 moves equal to or more than the predetermined operating angle.

That is, in this embodiment, it is determined whether each operation is performed by using, as a threshold, a time integration value of a pilot pressure which value is prescribed by a predetermined operating angle of the upper swing body 5 and the bucket 13, that is, the excavation-loading mechanism. Then, when it is determined that operations in the excavation-loading mechanism are performed in an order of the excavation, the forward swing, the soil discharge, and the backward swing, the number of times of loading is counted as once and accumulation calculation of the number of times of loading is performed. It is possible to use a pilot pressure, which is detected by the pressure sensor 55 mounted on an existing excavator 1, by using the time integration value prescribed by the predetermined operating angle of the excavation-loading mechanism. Thus, it is possible to perform calculation of the number of times of loading in a simple manner. In addition, since prescription with the predetermined operating angle is performed, it is only necessary to previously calculate time integration values, which differ depending on automobile ranks, by using an identical predetermined operating angle even when automobile ranks are different from each other. Each time integration value can be used as a threshold of operation determination. That is, such measurement processing of the number of times of loading has high general versatility. Also, it is not necessary to perform setting which depends on a work site when such basic measurement processing of the number of times of loading is used. Thus, it is possible to measure the number of times of loading without consideration of a place where the work site in which each excavator 1 is operated is.

Information of the accumulated number of times of loading is transmitted, for example, to the monitor 32 and the monitor 32 measures the work amount. The measurement of the work amount is performed by multiplying the accumulated number of times of loading by a previously-set bucket capacity. The result is displayed, for example, on a display unit of the monitor 32. Note that in this embodiment, operation time necessary for a series of excavation-loading work is accumulated and the accumulated operation time is output as a basic excavation and loading time, for example, to the monitor 32 and is displayed on the display/setting unit 27 of the monitor 32. The measurement of the work amount may be performed, for example, by using a computer or a mobile computer provided outside the excavator 1 such as a distant place. That is, information of the accumulated number of times of loading may be transmitted to the outside by using wireless or wired communication. The accumulated number of times of loading may be received by a reception apparatus included in the outside and measurement of a work amount may be performed by using a bucket capacity stored in an external storage apparatus.

Figure 6:
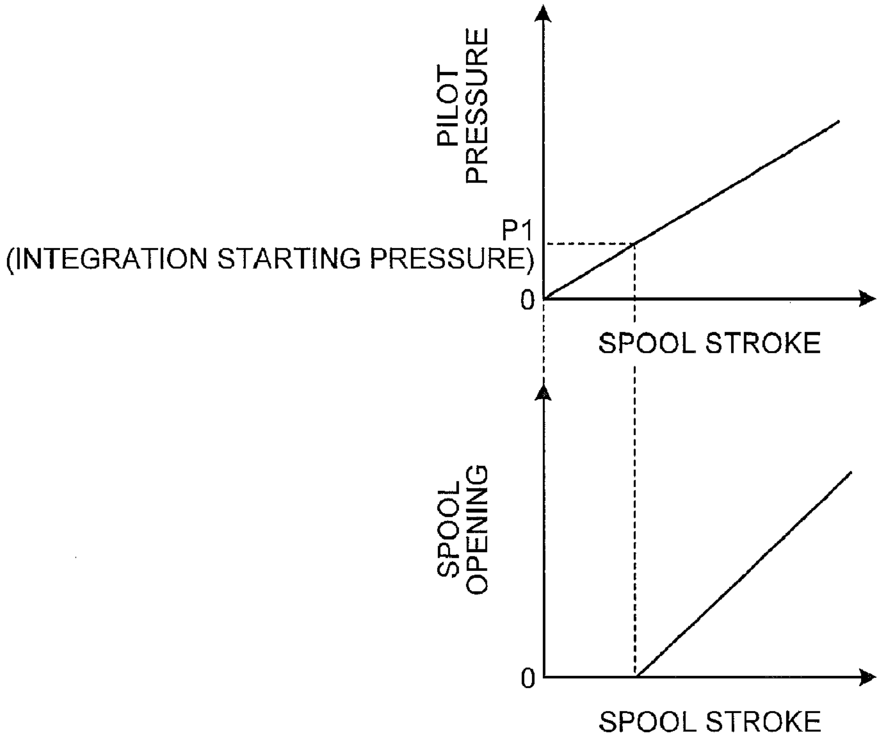
FIG. 6 is a view illustrating a relationship between a spool stroke and a pilot pressure and a spool opening.

FIG. 6 is a view illustrating a variation in a size of each of a pilot pressure and a spool opening with respect to a spool stroke. Here, as illustrated in FIG. 6, in a region where the pilot pressure is small, a spool stroke of a main valve (not illustrated) is zero. Thus, when the pilot pressure becomes equal to higher than the above-described integration starting pressure P1, time integration is started.

Figure 7:
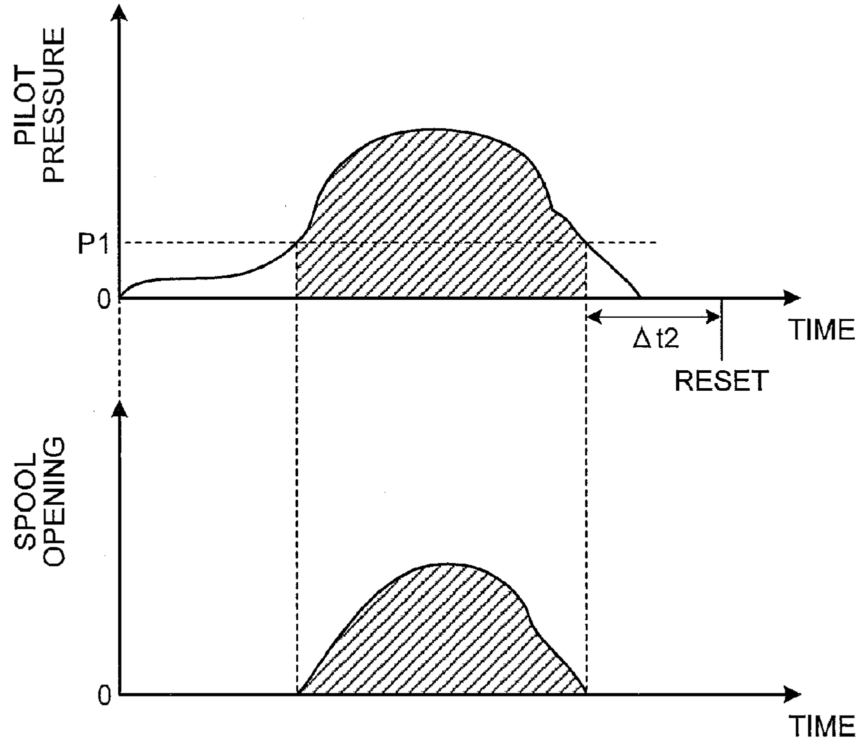
FIG. 7 is a time chart illustrating reset processing of a time integration value during an excavation operation.

Also, time integration processing of each operation is simultaneously performed in parallel. Accordingly, when the time integration values S1 to S4 of operations are calculated, time integration processing in each operation is reset and the excavation-loading work is repeatedly performed. Thus, it is necessary to repeatedly perform time integration processing. FIG. 7 is a time chart illustrating reset processing of a time integration value during an excavation operation. An upper view in FIG. 7 is a view illustrating a variation in a pilot pressure with respect to passage of time and a shaded part corresponds to a time integration value of the pilot pressure. Also, a lower view in FIG. 7 is a view illustrating a variation in a spool opening with respect to passage of time and a shaded part corresponds to an integration value of a spool opening area. As illustrated in FIG. 7, the reset processing is performed with a case, where the pilot pressure becomes lower than the integration starting pressure P1, as a reference. In order to eliminate an influence of a noise or the like, the reset processing is performed in predetermined time Δt2 after the pilot pressure becomes lower than the integration starting pressure P1. That is, the integration starting pressure P1 is an integration starting pressure and is also an operation end predetermined value which is a threshold for determination of an end of the processing. The predetermined time Δt2 is provided with respect to an excavation operation and a soil discharge operation and varies for each operation.

Figure 8:
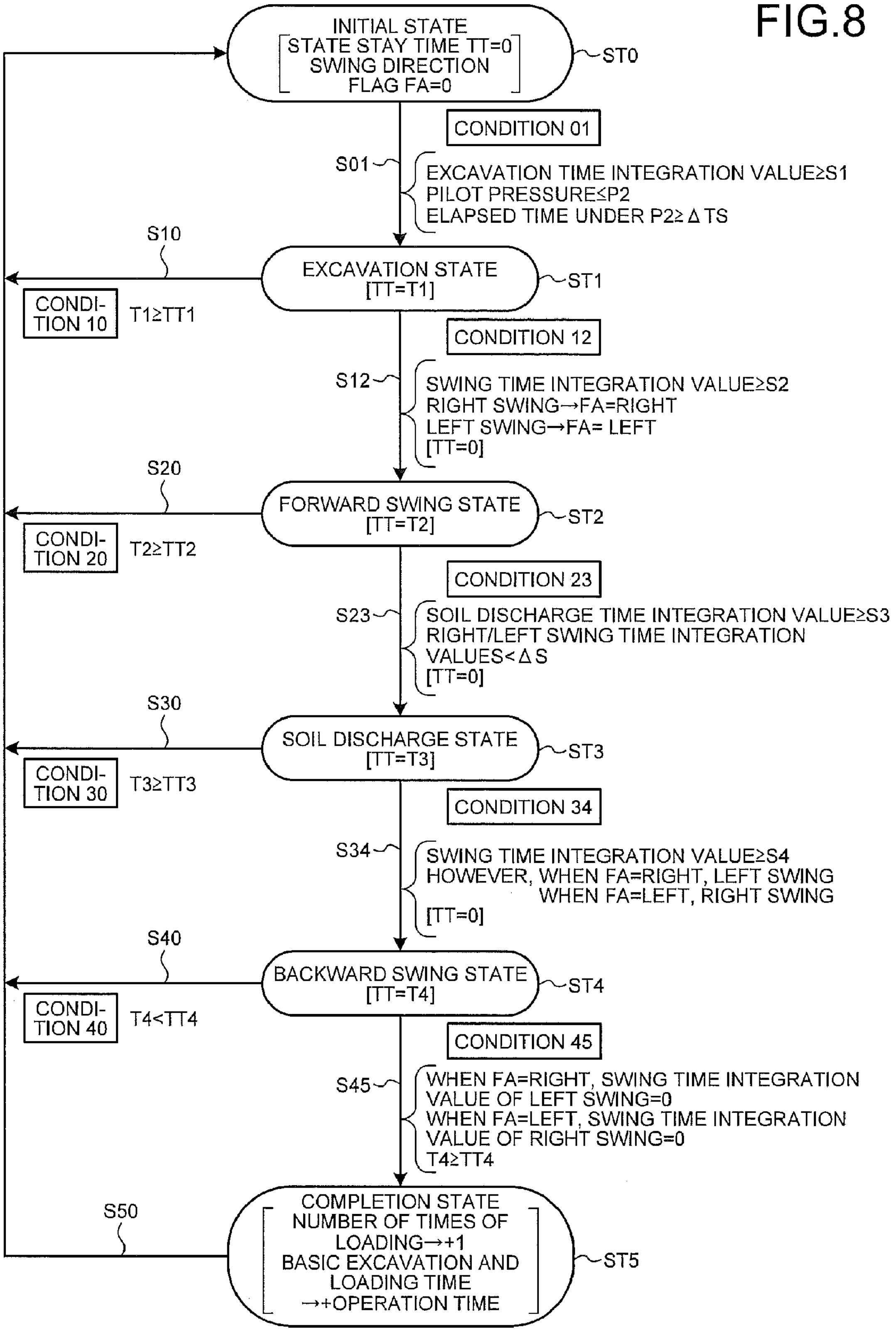
FIG. 8 is a state transition view illustrating basic measurement processing of the number of times of loading.

Here, with reference to a state transition view illustrated in FIG. 8, the basic measurement processing of the number of times of loading will be described. In the basic measurement processing of the number of times of loading, there are an initial state ST0, an excavation state ST1, a forward swing state ST2, a soil discharge state ST3, a backward swing state ST4, and a completion state ST5.

First, in the initial state ST0, a state stay time TT is set as zero and a swing direction flag FA is set as zero. When a condition 01 is satisfied in the initial state ST0, transition into the excavation state ST1 is performed (S01). The condition 01 is the excavation time integration value being equal to or larger than S1, the pilot pressure being equal to or lower than P2, and elapsed time after the pilot pressure becomes equal to or lower than P2 being equal to or longer than ΔTS. The pilot pressure P2 is a threshold used to determine whether an operation of the excavation is over and the state transition in FIG. 8 is possible. A detail of the state transition view in FIG. 8 will be described later.

Figure 9:
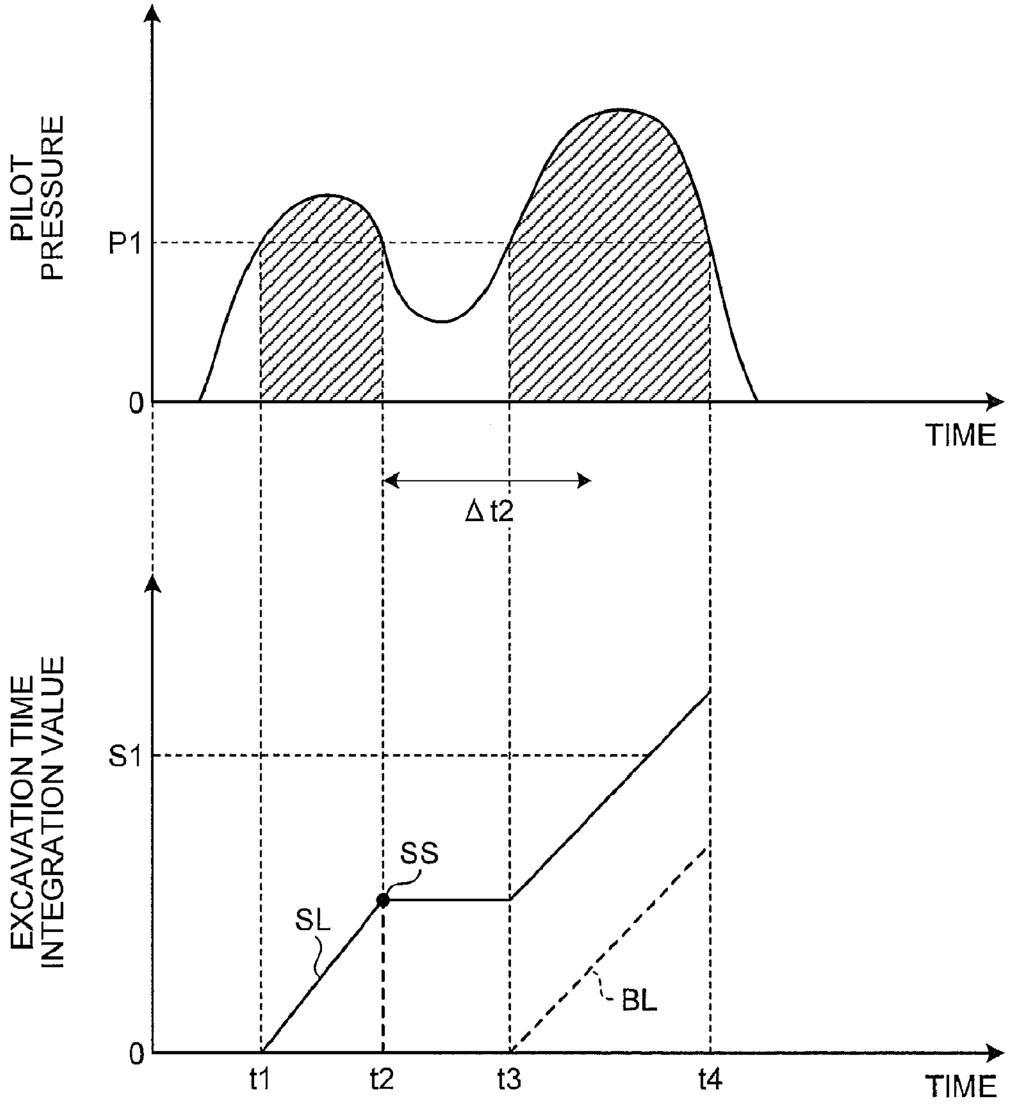
FIG. 9 is a time chart for describing time integration value holding time during the excavation operation.

FIG. 9 is a time chart for describing time integration value holding time during the excavation operation. Here, in the excavation operation, there is a case where a full lever operation to tilt the operation lever 42 to a tiltable stroke is not performed. That is, in order to perform the excavation, there is a case where the excavation operation is performed by tilting or pulling up the operation lever 42. As a result, as illustrated in an upper view in FIG. 9, there may be a case where an intermittent lever operation is performed in such a manner that a pilot pressure with respect to passage of time is increased or decreased with the integration starting pressure P1 as a border. Thus, elapsed time Δt2 (time integration value holding time) after the pilot pressure becomes equal to or lower than the integration starting pressure P1 is set as an adequately-large value in response to the excavation operation and it is made possible to determine an intermittent excavation operation as one excavation operation. Even when the pilot pressure becomes equal or lower than the integration starting pressure P1, in a case where the time integration value holding time Δt2 is not passed yet, the time integration processing is continued. Note that the swing operation is basically a full lever operation. Thus, at a time point at which the pilot pressure becomes equal to or lower than the integration starting pressure P1, the time integration processing is ended and the held time integration value is deleted (reset).

A lower view in FIG. 9 is a view illustrating a variation in a size of the excavation time integration value with respect to passage of time. As illustrated in FIG. 9, when the time integration is reset immediately at a time point t2 at which the pilot pressure becomes equal to or lower than the integration starting pressure P1, only an excavation time integration value having a size indicated by an intersection point SS between a broken line extended upward from the time point t2 and a solid line SL indicating an increase of the excavation time integration value in the lower view in FIG. 9 is acquired. Practically, it is necessary that an excavation time integration value indicated by the solid line SL in the lower view in FIG. 9 is acquired at a time point t4 and that it is determined that an excavation operation is performed when the excavation time integration value exceeds S1. That is, when the time integration is reset immediately at the time point t2 at which the pilot pressure becomes equal to or lower than the integration starting pressure P1, a time integration value up to the time point t2 is lost. Even when a time integration value is newly calculated from the time point t3 and the time point t4 is reached as indicated by the broken line BL, the excavation time integration value does not become equal to or larger than S1. Thus, it is not possible to perform transition into the excavation state ST1 although the excavation operation is practically performed in a period until the time point t4. Thus, the time integration value holding time Δt2 having a time of predetermined length is set.

Figure 10:
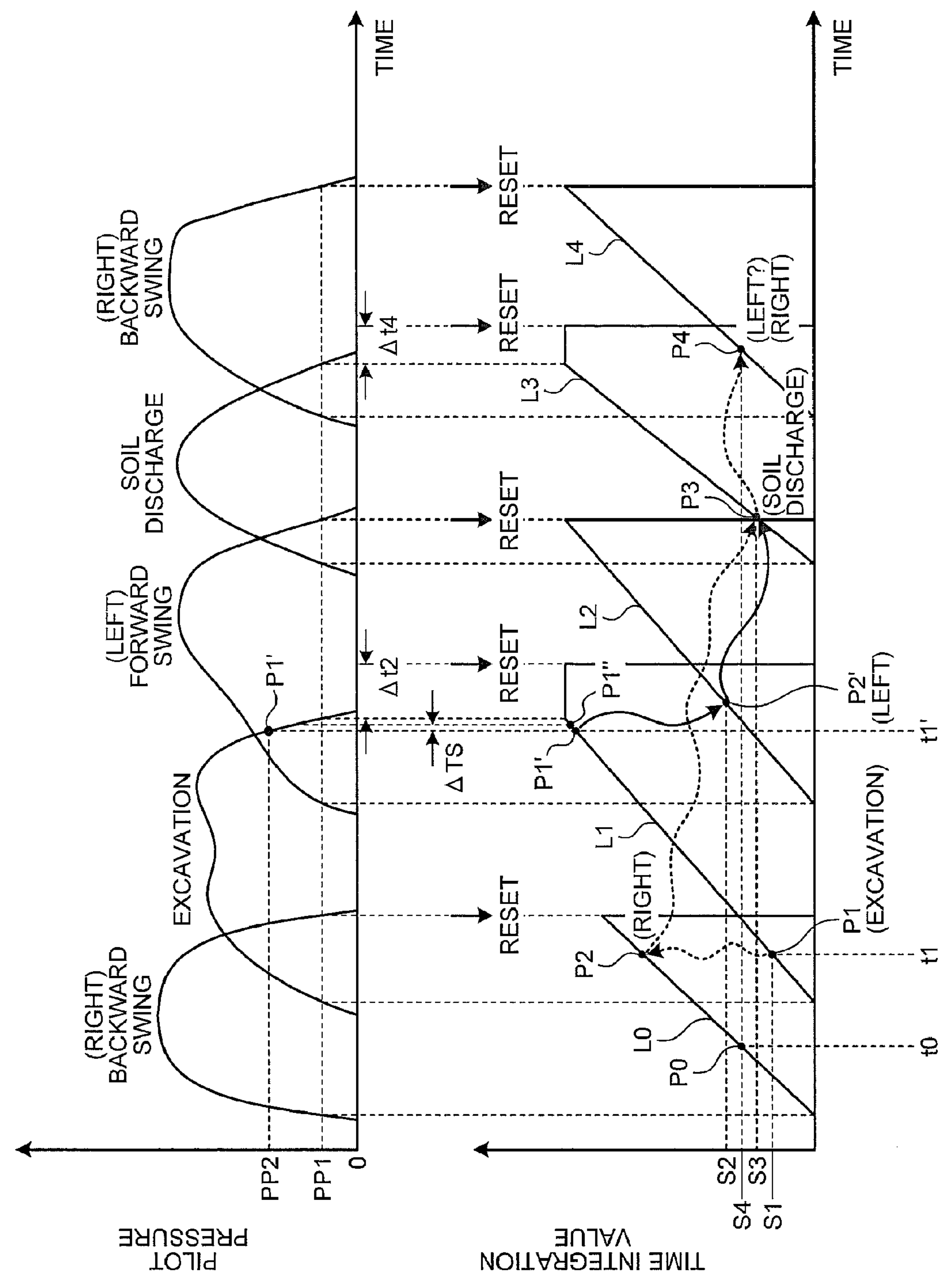
FIG. 10 is a time chart illustrating a relationship between erroneous determination of a next backward swing operation of when an excavation operation is performed during a backward swing operation and normal determination.

Incidentally, in the excavation-loading work, a next excavation operation may be started during the backward swing operation. When a determination end of the excavation operation is performed with a time integration value, there is a case where a next backward swing operation is determined erroneously. That is, the case is a case where an operation of the operation lever 42 for the bucket excavation is performed while an operation of the operation lever 41 for the backward swing is performed after the soil discharge is over. In the operation of the excavator 1 in such a case, the bucket 13 performs movement of the excavation while the upper swing body 5 swings in a direction of the backward swing. FIG. 10 is a time chart illustrating a relationship between erroneous determination of a next backward swing operation of when an excavation operation is performed during the backward swing operation and normal determination. Note that in an upper view in FIG. 10, a pilot pressure PP1 is illustrated. However, the pilot pressure PP1 is a different notation of the pilot pressure P1 described above and has the same meaning. Also, in the upper view in FIG. 10, a pilot pressure PP2 is illustrated. However, the pilot pressure PP2 is a different notation of the pilot pressure P2 and has the same meaning. Curved lines L0 to L4 illustrated in a lower view in FIG. 10 are illustrated by straight lines as a matter of convenience. According to a way of performing a lever operation, there are a case where a time integration value monotonically increases in a linear functional manner and a case where the time integration value does not increase in that manner. In the following description, expression is made as a curved line.

For example, as illustrated in FIG. 10, in a case where a next excavation operation is started in the middle of the backward swing operation, in the first backward swing operation, a time integration value of the curved line L0 is acquired and end determination of the backward swing operation is performed at a point P0 (time point t0) on the curved line L0. In the next excavation operation, a time integration value of the curved line L1 is acquired. Since the time integration value reaches S1 at a point P1 (time point t1) on the curved line L1, end determination of the excavation operation is performed. Accordingly, the pump controller 31 acquires a time integration value of a next swing (forward swing). However, since the pilot pressure of the backward swing is not lower than PP1, the time integration value of the curved line L0 is not reset and a time integration value at a point P2 on the curved line L0 is acquired as a time integration value of the forward swing. In the basic measurement processing of the number of times of loading, the following rule is provided. That is, the forward swing may be a right swing or a left swing. Also, when the forward swing is the right swing, the backward swing has to be the opposite thereof and has to be a left swing. When the forward swing is the left swing, the backward swing has to be the opposite thereof and has to be a right swing. When the operation lever 41 is tilted to the right or left, a pilot pressure of the right swing or a pilot pressure of the left swing is generated. Two pressure sensors 55 to detect a pilot pressure associated with an operation of the swing are provided. There are a pressure sensor 55 to detect the pilot pressure of the right swing and a pressure sensor 55 to detect the pilot pressure of the left swing. For example, when a lever operation of the right swing is performed, a swing direction flag FA is set in a signal output from the pressure sensor 55 to detect the pilot pressure of the right swing. When a lever operation of the left swing is performed, the swing direction flag FA is set in a signal output from the pressure sensor 55 to detect the pilot pressure of the left swing. However, in the excavation-loading work, it is determined whether the left swing is performed or the right swing is performed after the excavation depending on a positional relationship among the excavation position E1, the excavator 1, and the dump truck 50. Thus, with respect to the forward swing, in the basic measurement processing of the number of times of loading, the right and left are not distinguished from each other. However, a swing direction of the forward swing and that of the backward swing have to be the opposite from each other. Thus, the above rule is provided.

Here, the point P2 is a time integration value calculated from a pilot pressure generated during a right swing. Thus, it is determined that the forward swing is a right swing. Then, the pump controller 31 tries to acquire a time integration value of a soil discharge operation which is the following operation of the forward swing. Thus, although a normal time integration value of the forward swing is on the curved line L2, a state transition into the forward swing is skipped, an operation of the soil discharge is performed, and the time integration value reaches S3 at the point P3 on the curved line L3 which is a time integration value of the soil discharge operation. Accordingly, end determination of the soil discharge operation is performed. The pump controller 31 further acquires a time integration value of the backward swing operation. At the point P4 on the curved line L4, the time integration value reaches S4, and thus, an operation of the backward swing is performed. A time integration value for determination that the operation of the backward swing is performed is satisfied. However, a swing direction is not a left swing but a right swing although it is previously determined that the forward swing is the right swing. Thus, erroneous determination that the backward swing is skipped is performed.

Figure 11:
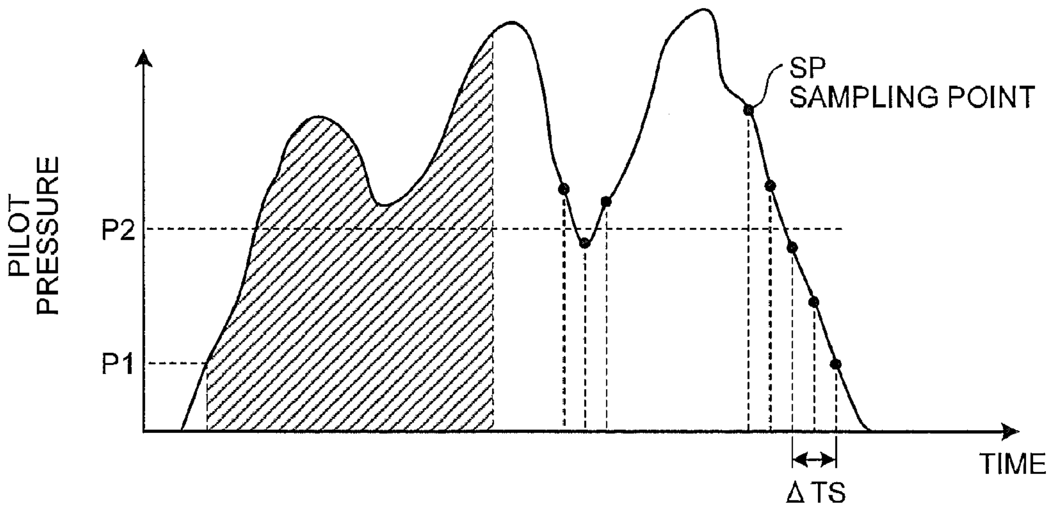
FIG. 11 is a graph illustrating a variation in a pilot pressure with respect to passage of time.

The erroneous determination is caused because a time integration value of the previous swing operation remains without being reset immediately after the time point t1 at which the end determination of the excavation operation is performed at the point P1. Thus, in this embodiment, the end determination of the excavation operation is delayed and a time integration value of the backward swing operation is brought into a reset state during the end determination of the excavation operation. In order to make the state, the time integration value of the excavation operation becomes equal to or larger than S1 and the pilot pressure becomes equal to or lower than PP2. Also, in order to eliminate an influence of a noise or the like, end determination of the excavation operation is performed when predetermined time ΔTS passes from a time point at which the pilot pressure becomes equal to or lower than PP2. The predetermined time ΔTS is, for example, time which is twice of a sampling period (see FIG. 11). FIG. 11 is a graph illustrating a variation in a pilot pressure with respect to passage of time. That is, as illustrated in FIG. 11, the predetermined time ΔTS is twice of a period to perform sampling of the pilot pressure and is time which is twice of time between two continuous sampling points SP. In such a manner, end determination of the excavation operation is not performed due to detection of an instantaneously-decreased pilot pressure and erroneous determination is prevented. Note that as described in the above and in FIG. 9, time integration processing of the excavation is reset at a time point at which time integration value holding time Δt2 passes from a time point t1' at which a pilot pressure generated by an operation of the excavation becomes equal to or lower than the integration starting pressure PP1. Note that as described in the present embodiment, the predetermined time ΔTS is preferably provided but is not what must be provided.

More specifically, as illustrated in FIG. 10, when such processing is performed, end determination of the excavation operation is temporarily performed at the point P1' (time point t1') on the curved line L1 of the time integration value of the excavation after end determination of the backward swing is performed at the point P0 (time point t0). Then, end determination of the excavation operation is performed at a point P1" after the predetermined time ΔTS further passes from the point P1'. Then, since the time integration value of the forward swing reaches S2 at a point P2' on the curved line L2 indicating the time integration value of the forward swing, end determination of the forward swing is performed. Moreover, since the time integration value of the soil discharge reaches S3 at the point P3 on the curved line L3, the end determination of the soil discharge operation is performed. Furthermore, since the time integration value of the backward swing reaches S4 at the point P4 on the curved line L4, it is possible to perform end determination of the backward swing in a normal manner.

Now, referring back to FIG. 8, when a state becomes the excavation state ST1, state stay time TT in the excavation state ST1 is clocked. Here, it is assumed that the state stay time TT is T1. When a condition 12 is satisfied in the excavation state ST1, transition into the forward swing state ST2 is performed (S12). The condition 12 is a swing time integration value being equal to or larger than S2. Note that as described above, a swing direction of the forward swing may be either of the right and the left in the basic measurement processing of the number of times of loading. However, for transition determination into the following backward swing state ST4, it is determined whether a swing is the right swing or the left swing based on a pilot pressure generated according to a tilted direction of the operation lever 41 as described above, that is, an electric signal output from the pressure sensor 55. As a result, when the swing is the right swing, the swing direction flag FA is set on the right and when the swing is the left swing, the swing direction flag FA is set on the left. Also, in transition into the forward swing state ST2, the state stay time TT is reset into zero.

Also, when state stay time T1 in the excavation state ST1 is equal to or longer than predetermined time TT1 (condition 10), transition into the initial state ST0 is performed (S10).

When a state becomes the forward swing state ST2, state stay time TT in the forward swing state ST2 is clocked. Here, it is assumed that the state stay time TT is T2. When a condition 23 is satisfied in the forward swing state ST2, transition into the soil discharge state ST3 is performed (S23). The condition 23 is a soil discharge time integration value being equal to or larger than S3 and a right/left swing time integration value being smaller than ΔS. Also, during transition into the soil discharge state ST3, the state stay time TT is reset into zero. A reason why it is provided in the condition 23 whether the right/left swing time integration value is smaller than ΔS will be described. When the soil discharge is performed, a swing is not supposed to be performed. The right/left swing time integration value is a time integration value of the pilot pressure generated by an operation of the right swing or the left swing of the operation lever 41. In the forward swing state (ST2), by determining whether a swing is performed in such a manner that the right/left swing time integration value exceeds a predetermined value (ΔS), it is determined whether state transition into the soil discharge state ST3 can be performed. When the right/left swing time integration value exceeds ΔS, work of performing a swing during the soil discharge is assumed and the work is, for example, spreading soil on a predetermined range. In this case, transition into the initial state ST0 is performed (S20) and a count number of the number of times of loading is prevented from being erroneously determined.

Also, when the state stay time T2 in the forward swing state ST2 is equal to or longer than predetermined time TT2 (condition 20), transition into the initial state ST0 is performed (S20).

When a state becomes the soil discharge state ST3, state stay time TT in the soil discharge state ST3 is clocked. Here, it is assumed that the state stay time TT is T3. When a condition 34 is satisfied in the soil discharge state ST3, transition into the backward swing state ST4 is performed (S34). The condition 34 is a swing time integration value being equal to or larger than S4. Note that in the condition, the swing time integration value is a time integration value of the left swing when a swing direction is an opposite direction of a forward swing direction, that is, when the swing direction flag FA is on the right and the swing time integration value is a time integration value of the right swing when the swing direction flag FA is on the left. Also, during transition into a backward swing state ST4, the state stay time TT is reset into zero.

Also, when state stay time T3 in the soil discharge state ST3 is equal to or longer than predetermined time TT3 (condition 30), transition into the initial state ST0 is performed (S30).

When a state becomes the backward swing state ST4, state stay time TT in the backward swing state ST4 is clocked. Here, it is assumed that the state stay time TT is T4. When a condition 45 is satisfied in the backward swing state ST4, transition into the completion state ST5 is performed (S45). In the condition 45, when the swing direction flag FA is on the right, a swing time integration value of the left swing is zero and when the swing direction flag FA is on the left, a swing time integration value of the right swing is zero and the state stay time T4 is equal to or longer than predetermined time TT4.

Also, when the state stay time T4 in the backward swing state ST4 is shorter than the predetermined time TT4 (condition 40), transition into the initial state ST0 is performed (S40).

When a state becomes the completion state ST5, the number of times of loading is counted only once and accumulation adding is performed. When there is the previously-accumulated number of times of loading, one is added to the number of times of loading. The calculated number of times of loading is stored into a storage apparatus (not illustrated) included in the pump controller 31. A timer function (not illustrated) is embedded into the pump controller 31. Time used from the start of the excavation until the completion of the backward swing in a case where the number of times of loading is counted as once is measured. That is, clocking in a timer is started when it is detected that a pilot pressure of the excavation exceeds the predetermined integration starting pressure P1 such as what is illustrated in FIG. 5. Then, soil discharge is performed after the forward swing and the backward swing is performed. When transition into the completion state ST5 is performed, clocking in the timer is ended and time from the start to the end is calculated as basic excavation and loading time. The calculated basic excavation and loading time is stored into the storage apparatus (not illustrated) included in the pump controller 31. Then, transition into the initial state ST0 is performed (S50).

[Deemed Counting Processing]

Incidentally, the above-described series of excavation-loading work, there is a case where the excavation operation to the forward swing operation are performed in the first excavation-loading work and holding still in a state of waiting for the dump truck 50 is performed. Also, there is a case where the backward swing is not performed after the soil discharge and waiting for an arrival of a next dump truck 50 is directly performed. In this case, the clocked state stay time T2 exceeds the predetermined time TT2 and transition into the initial state is performed (S20). Thus, there is a case where accumulation adding of the number of times of loading is not performed once and the number of times of loading is erroneously determined. Also, there is a case where holding still is performed without performing the backward swing operation after the soil discharge and waiting for the dump truck 50 is performed. In this case, the clocked state stay time T3 also exceeds the predetermined time TT3 and transition into the initial state is performed (S30). Thus, there is a case where accumulation adding of the number of times of loading is not performed once and the number of times of loading is erroneously determined.

That is, in the basic measurement processing of the number of times of loading, in a case of determining whether an operation, of the excavation-loading mechanism, such as an excavation operation included in a series of excavation-loading work is performed, when a state stay time in a state of an operation of an identical excavation-loading mechanism passes predetermined time without a condition to perform transition into an operation of a next excavation-loading mechanism being satisfied, transition into the initial state is performed and counting processing of the number of times of loading is reset. However, even in a case of performing such reset processing, there is a specific state to be counted as the number of times of loading. When the specific state is missed, erroneous determination is made.

Figure 12:
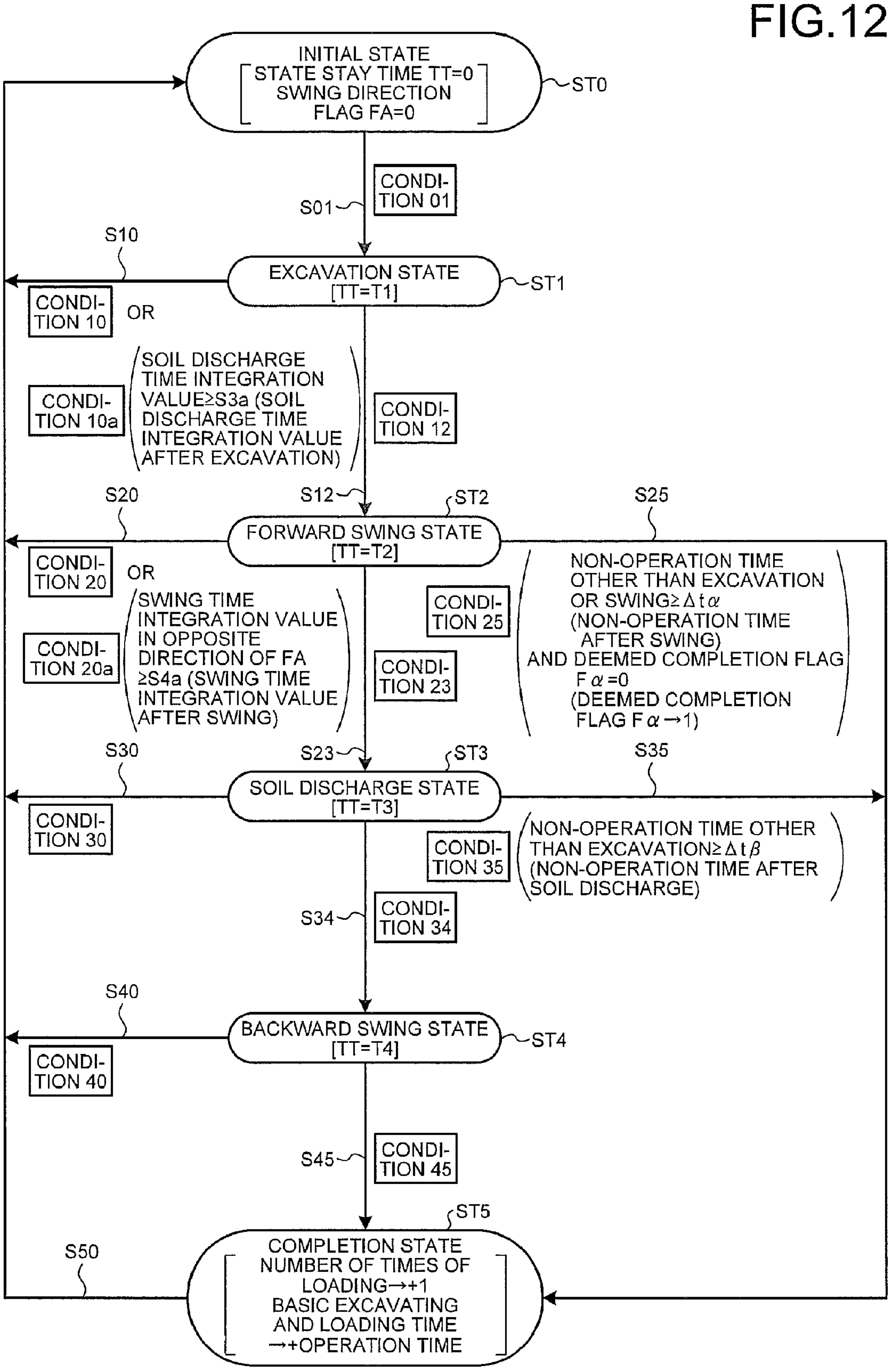
FIG. 12 is a state transition view illustrating basic measurement processing of the number of times of loading which processing includes deemed counting processing and exclusion processing of a supplemental work.

Thus, in this embodiment, a state transition condition illustrated in FIG. 12 is added and deemed counting processing to assume a specific operation, which may be performed during a series of excavation-loading work, as once in performance of the excavation-loading work.

First, non-operation time Δtα after a swing is set previously. When a specific state such as a condition 25 is satisfied in the forward swing state ST2, transition into the completion state ST5 is performed and accumulation counting of the number of times of loading is performed once (S25). The condition 25 is the non-operation time other than the excavation or the swing being equal to or longer than Δtα and a deemed completion flag Fα being zero, that is, the deemed counting processing being never performed. The non-operation time other than the excavation or the swing means that all of bucket soil discharge non-operation time, boom lifting non-operation time, boom lowering non-operation time, arm excavation non-operation time, and arm soil discharge non-operation time become equal to or longer than the non-operation time Δtα after the swing. Note that the non-operation time of the excavation or the swing is excluded because there is a case where a swing operation is stopped in the middle of the operation or a case where an operation is performed by moving the bucket 13 in a small motion while folding still. It is because there is a case where the bucket 13 filled with soil or the like is naturally lowered by its own weight and it is necessary to perform operation to lift the lowered bucket 13 (tilting operation of operation lever 42 to left side, that is, to bucket excavation side).

Note that a case where the deemed counting processing by the condition 25 is necessary is a case where the excavation-loading work is performed by the excavator 1 for five times to fill one dump truck 50 with soil. That is, the deemed counting processing is necessary in the first series of excavation-loading work or in the last (fifth) series of excavation-loading work among five times of the excavation-loading work. Thus, in a case where the condition 25 is satisfied, the deemed completion flag Fα is set as one and the deemed completion flag Fα being zero is a condition in the condition 25. That is, the deemed counting processing being never performed is a condition. Note that when the soil discharge operation is performed next, the deemed completion flag Fα is set as zero.

Moreover, non-operation time Δtβ after the soil discharge is previously set. Then, when a specific state such as a condition 35 is satisfied in the soil discharge state ST3, transition into the completion state ST5 is performed and accumulation counting of the number of times of loading is performed once (S35). The condition 35 is non-operation time other than the excavation being equal to or longer than the non-operation time Δtβ after the soil discharge. Note that the non-operation time of the excavation is excluded because there is a case where the operation to move the bucket in a small motion during the holding still is performed as described above.

[Exclusion Processing of Supplemental Work]

Incidentally, supplemental work may be started during a series of excavation-loading work in practical work. For example, there is a case where a soil discharge operation is performed immediately after the excavation operation is performed or a case where an opposite swing operation is performed immediately after the swing operation is performed. The supplemental work is work, in which an order of operations of the excavation-loading mechanism included in a series of excavation-loading work is different, and is work similar to the series of excavation-loading work. Thus, there is a case where erroneous determination is made. Thus, in this embodiment, such supplemental work is considered as a specific state and excluded actively and erroneous determination is eliminated.

That is, in the excavation state ST1, a condition 10*a*, in which a soil discharge time integration value becomes equal to or larger than a soil discharge time integration value S3*a* after the excavation, is added. When the condition 10*a* is satisfied, transition into the initial state ST0 is performed (S10). The soil discharge time integration value S3*a* after the excavation is a previously-set value. Also, in the forward swing state ST2, a condition 20*a*, in which a swing time integration value in an opposite direction of a swing direction indicated by a current swing direction flag FA becomes equal to or larger than S4*a*, is added. When the condition 20*a* is satisfied, transition into the initial state ST0 is performed (S20). The swing time integration value S4*a* after the swing is a previously-set value.

[Exclusion Processing Corresponding to External State]

Incidentally, there is a case where a series of operations in which the traveling levers 43 and 44 are operated and a traveling operation is mixed is not a series of excavation-loading work. When this is not considered, the number of times of loading may be counted as long as an operation of the operation levers 41 and 42 is detected by the pilot pressure. It is necessary to eliminate such erroneous determination.

Also, even when a work mode is a mode not to perform a series of excavation-loading work, the number of times of loading may be counted as long as an operation of the operation levers 41 and 42 is detected by the pilot pressure.

Moreover, a case where the swing lock unit 33 is operated and a swing lock of the upper swing body 5 is performed is a case in which it is not intended to perform a swing. When this is not considered, the number of times of loading may be counted as long as an operation of the operation levers 41 and 42 is detected by the pilot pressure.

Also, when the pressure sensor 55 to detect a pilot pressure is broken or when a communication line to connect the pressure sensor 55 and the pump controller 31 is disconnected, an erroneous time integration value is calculated and erroneous determination is made when such an abnormal state is not considered. Erroneous determination in such a case is to be eliminated.

Each of these states is a state (specific operation state) in which a specific operation not related to a series operations of the excavation-loading mechanism is performed in a state in which an operation of the excavation-loading mechanism, which operation is related to an operation in the series of excavation-loading work, can be performed. In the specific operation state, it is necessary to reset counting processing of the number of times of loading and to prevent erroneous determination.

Figure 13:
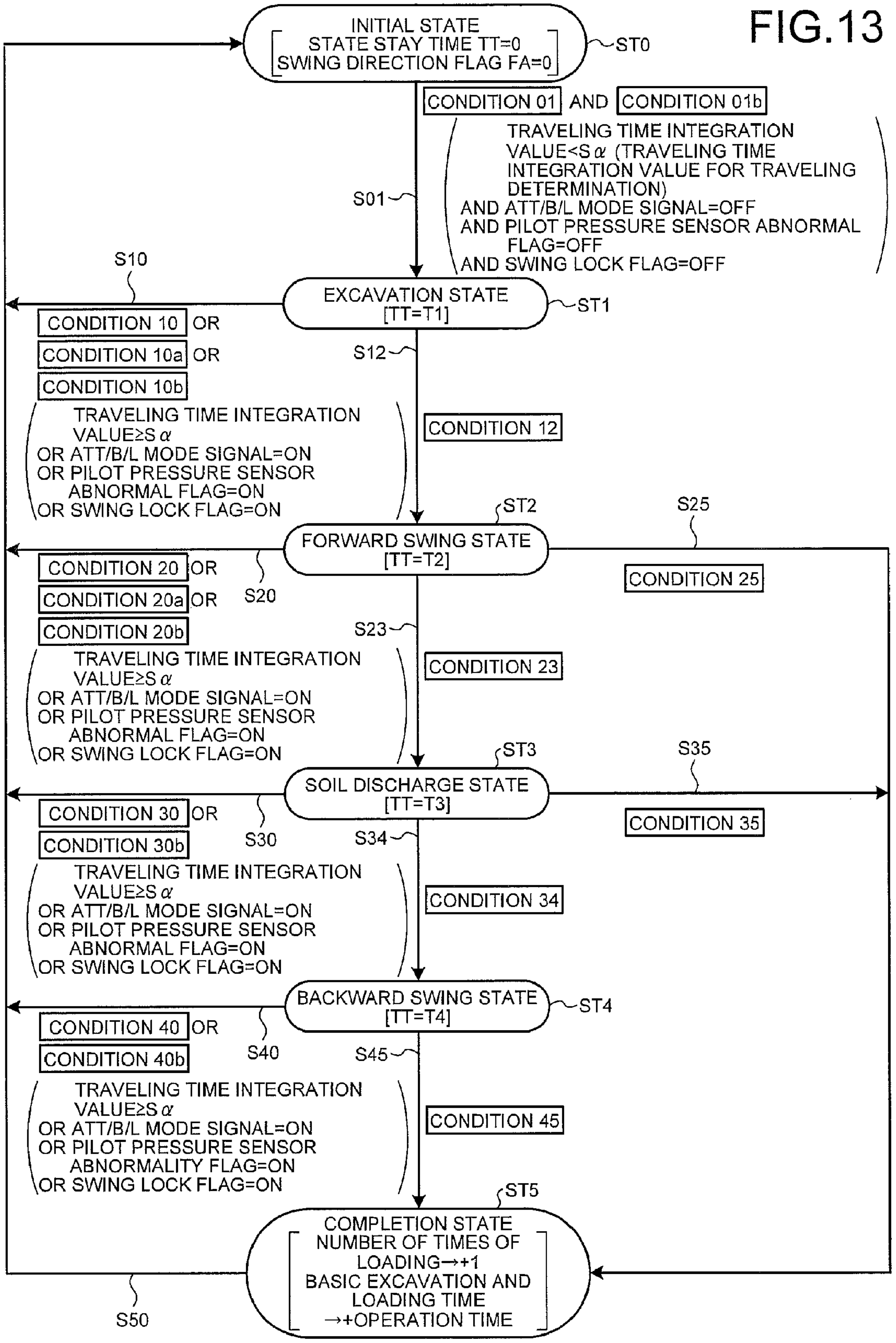
FIG. 13 is a state transition view illustrating basic measurement processing of the number of times of loading which processing includes deemed counting processing, exclusion processing of a supplemental work, and exclusion processing corresponding to an external state.

Thus, as illustrated in a state transition view in FIG. 13, an exclusion condition is further added. However, with respect to the traveling operation, an operator may accidentally touches the traveling levers 43 and 44 without intending to perform the traveling operation. In this case, resetting the counting processing of the number of times of loading adversely causes erroneous determination. Thus, determination whether a state is the traveling work state is made similarly to each operation of the excavation, the swing, and the soil discharge. That is, when a traveling time integration value of the pilot pressure of each of the traveling levers 43 and 44 is acquired and the traveling time integration value becomes equal to or larger than a traveling time integration value Sα for traveling determination, it is determined that a state is the traveling work state. The traveling time integration value Sα for traveling determination is a previously-set value. When the operator operates the traveling levers 43 and 44 with an obvious intention to perform a traveling operation, a relatively-large traveling time integration value is acquired. As the relatively-large traveling time integration value, Sα is set. Accordingly, even when the operator touches the traveling levers 43 and 44 during the series of excavation-loading work, it is possible to perform the counting processing of the number of times of loading in a normal manner.

That is, as illustrated in FIG. 13, in the initial state ST0, a condition 01*b* is added to the condition 01 as an AND condition. In the condition 01*b*, a traveling time integration value is smaller than the traveling time integration value Sα for traveling determination, a work mode is not set as the ATT mode, the B mode, or the L mode (ATT/B/L mode signal is OFF), there is no abnormality in the pressure sensor 55 to detect the pilot pressure (pilot pressure sensor abnormal flag is OFF), and the swing lock unit 33 is not operated and the upper swing body 5 can swing (swing lock flag is OFF).

Also, each of the conditions 10 and 10*a* and the conditions 20 and 20*a* is an OR condition. Conditions 10*b*, 20*b*, 30*b*, and 40*b* are further added as OR conditions. In each of the conditions 10*b*, 20*b*, 30*b*, and 40*b*, a traveling time integration value is equal to or larger than the traveling time integration value Sα for traveling determination, a work mode is set as any of the ATT/B/L modes (ATT/B/L mode signal is ON), there is an abnormality generated in the pressure sensor 55 to detect the pilot pressure (pilot pressure sensor abnormal flag is ON), or the swing lock unit 33 is operated and the upper swing body 5 is not able to swing (swing lock flag is ON). Note that in the above-described specific operation state, instead of resetting the counting processing of the number of times of loading as described above, accumulation adding of the number of times of loading may be tentatively performed in the specific operation state and counting processing of the number of times of generation of the specific operation state may be separately performed. Then, a calculation to perform subtraction processing of the number of times of generation of the specific operation state from the calculated number of times of loading, that is, correction processing may be performed and the correct number of times of loading may be calculated. The subtraction processing is performed, for example, after a daily operation is over. Thus, the calculated correct number of times of loading can be used for daily work management. As described above, even when there is a specific operation state, by performing reset processing or correction processing of counting processing of the number of times of the excavation-loading work, erroneous determination of the number of times of loading can be prevented.

[Work Management Processing]

Figure 14:
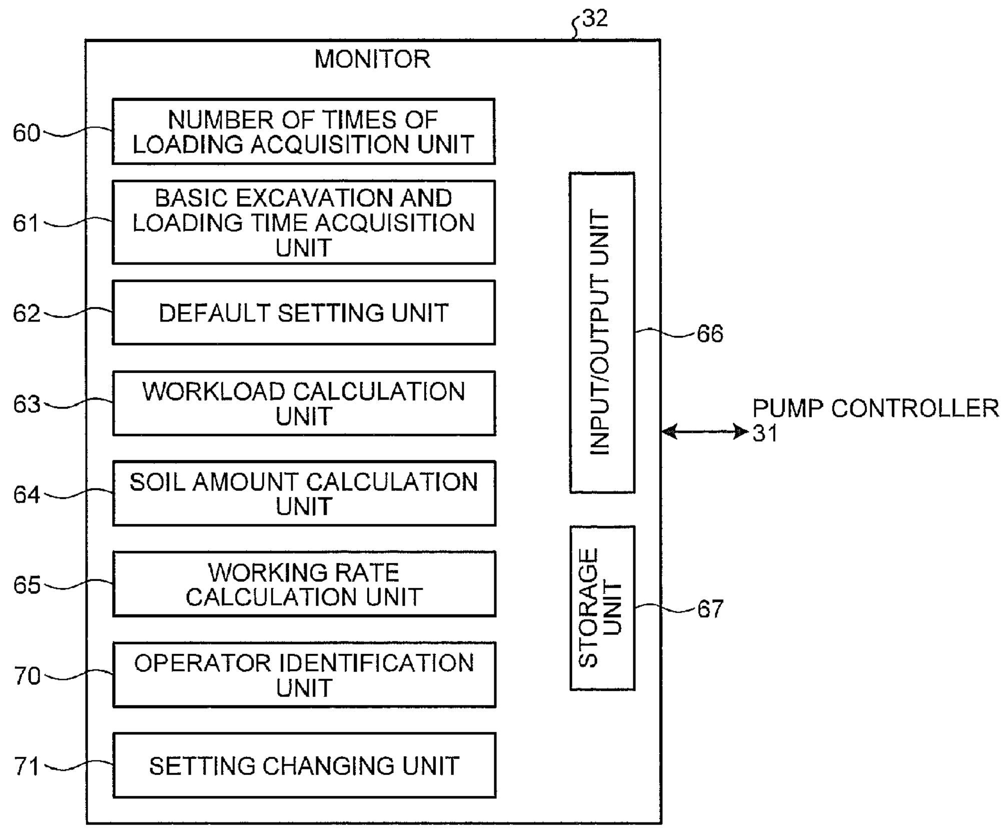
FIG. 14 is a block diagram illustrating a detail configuration of a monitor.

From the storage apparatus (not illustrated) of the above-described pump controller 31, the monitor 32 at least acquires the number of times of loading and the basic excavation and loading time. As illustrated in FIG. 14, the monitor 32 includes a number of times of loading acquisition unit 60, a basic excavation and loading time acquisition unit 61, a default setting unit 62, a workload calculation unit 63, a soil amount calculation unit 64, a working rate calculation unit 65, an input/output unit 66, and a storage unit 67. Moreover, the monitor 32 includes an operator identification unit 70 and a setting changing unit 71.

The default setting unit 62 holds, in the storage unit 67, data (default) indicating a bucket capacity of the excavator 1, the number of dump trucks, and a dump truck payload, input setting of the data being performed by the input/output unit 66. The dump truck payload is an amount of soil which can be loaded on one dump truck. Note that in the present embodiment, a case of loading soil into the dump truck 50 has been described. However, in a case where soil or the like is loaded by the excavator 1 into a transportation vessel, which includes a pallet used for dredging operation of a port and harbor, instead of the dump truck 50, work management processing described in the following can be also executed. A payload of the pallet of the transportation vessel and the number of transportation vessels are held in the storage unit 67. Alternatively, in a case where excavation and loading of soil or the like into a train or a carriage instead of the dump truck 50 is performed, it is also possible to execute the work management processing when necessary data is stored in the storage unit 67. That is, the present embodiment can be applied to a case where soil or the like is loaded into various collectors such as the dump truck 50, a transportation vessel, a train, and a carriage.

The workload calculation unit 63 calculates a workload which is calculated by integrating a bucket capacity to the number of times of loading acquired by the number of times of loading acquisition unit 60 and holds, for example, the calculated daily workload in the storage unit 67. The soil amount calculation unit 64 calculates a soil amount which is calculated by multiplying the number of dump trucks by a dump truck payload and holds, for example, the calculated daily soil amount in the storage unit 67. The working rate calculation unit 65 calculates a value, which is a soil amount divided by a workload, as a working rate and holds, for example, the calculated daily working rate in the storage unit 67.

Here, it is assumed that the workload is a summed value of the soil amount and work to be counted. The work to be counted means work which is not actual excavation-loading work by the excavator 1. For example, in a case where the bucket 13 is operated and a swing operation of the upper swing body 5 is performed without actually excavating soil, such an operation may be determined as one excavation-loading work (number of times of loading). In such a manner, in a case where an operation of the excavation-loading mechanism which operation is not the actual excavation-loading work is performed (case where the work to be counted is performed), the number of times of loading is counted since it is not detected whether soil is in the bucket 13. Thus, the number of times of loading acquired by the number of times of loading acquisition unit 60 becomes greater than the number of times of loading corresponding to the soil amount. That is, there may be a case where the workload and the soil amount are identical. However, a workload in the other case becomes a value larger than the soil amount. Thus, when a working rate is calculated, it is possible to understand in what degree the work to be counted is performed and to understand in what degree the excavation-loading work is performed by contraries.

For example, the monitor 32 graphs each daily data such as a workload, a soil amount, and a working rate and outputs the graph from the input/output unit 66. The graph in which each data is used may be displayed on the display/setting unit 27 of the monitor 32. Also, the monitor 32 includes an output unit which can output each data in a wireless or wired manner and may output each data such as the workload, the soil amount, or the working rate to the outside of the excavator 1 through the output unit.

Figure 15:
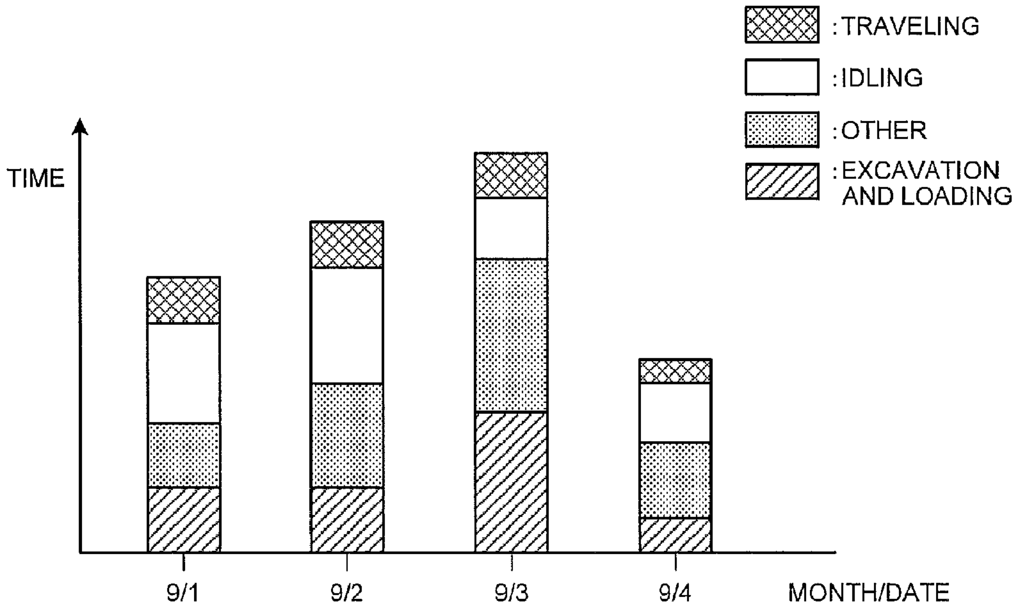
FIG. 15 is a view illustrating a display example of work management using basic excavation and loading time.

Also, for example, as illustrated in FIG. 15, the monitor 32 performs a display output of a daily ratio of excavation-loading working time with respect to work time of the excavator 1 by using moving body information such as basic excavation and loading time acquired by the basic excavation and loading time acquisition unit 61, traveling time acquired from the engine controller 30 or the like, working time clocked by a service meter, or idling time. Also, the monitor 32 may perform a display output of daily basic excavation and loading time. Above-described each data (workload, soil amount, working rate, ratio of excavation-loading work time with respect to working time of excavator 1) may be calculated in the outside of the excavator 1 by a work management system described later. For example, moving body information or each data, which is calculated by the excavator 1, such as the number of times of loading, the basic excavation and loading time, the traveling time, the idling time, and the working time may be output from the input/output unit 66 which functions as an output unit or may be output to the outside from the storage apparatus (not illustrated) of the pump controller 31 through an output apparatus (output unit/not illustrated) in a wired or wireless manner. Then, the soil amount, the workload, the working rate, and the ratio of excavation-loading work time with respect to working time may be calculated and graphed by a computer included in the outside and may be displayed on a display apparatus connected to the computer. In a case of outputting the moving body information or each data to the outside of the excavator 1 in a wireless manner, each data is output from an antenna 117*a* through a transmission/reception device 117 which is a work machine-side communication unit illustrated in FIG. 16. A detail of FIG. 16 will be described later. A mobile terminal may be used instead of the computer included in the outside and a display apparatus of the mobile terminal may be used instead of the display apparatus. FIG. 15 is a view illustrating a daily ratio of excavation-loading work time of a certain excavator 1. However, this is not the limitation. With respect to a plurality of excavators 1, a ratio of excavation-loading work time can be calculated in a similar manner and comparison with each excavator can be performed. A graph illustrated in FIG. 15 may be created for each operator. In addition, the graph illustrated in FIG. 15 may be displayed for each construction site.

Note that the operator identification unit 70 identifies operator identification information (hereinafter, referred to as identification information). The identified identification information is associated with a number of times of loading or basic excavation and loading time of each operator and is held in the storage unit 67.

Here, the excavator 1 may include an immobilizer apparatus. By an ID key in which individual identification information is stored, it becomes possible to start an engine of the excavator 1. When the immobilizer apparatus reads identification information of the ID key, information in which the identification information and the number of times of loading in a predetermined period such as one day are associated with each other is stored into the storage unit 67. By outputting the associated information (number of times of loading of each operator) to the outside through the input/output unit 66, it becomes possible to perform operator management to manage which operator performs how much work (excavation-loading work).

Also, when one excavator 1 is used by a plurality of operators, a plurality of ID keys is used. Thus, work amount management of each operator can be performed with respect to the one excavator 1. Also, when setting is performed in such a manner that engines of a plurality of excavators 1 can be started with one ID key, by outputting data of vehicle identification information to identify each vehicle of the plurality of excavators 1, identification information of the ID key, data of the number of times of loading, or the like to the outside, it is possible to manage how much work amount is performed by one operator with which excavator.

Also, an ID number identification apparatus, to which an individual ID number is input from the input/output unit 66 of the monitor 32 and which performs individual recognition of an operator, or a reading apparatus of an ID card may be included and individual recognition of the above-described operator may be performed and the above management may be performed without using the immobilizer apparatus. Note that a fingerprint authentication apparatus may be used as an apparatus to individually recognize an operator. That is, since the operator identification unit 70 is included, it is possible to perform work management of an operator.

Figure 16:
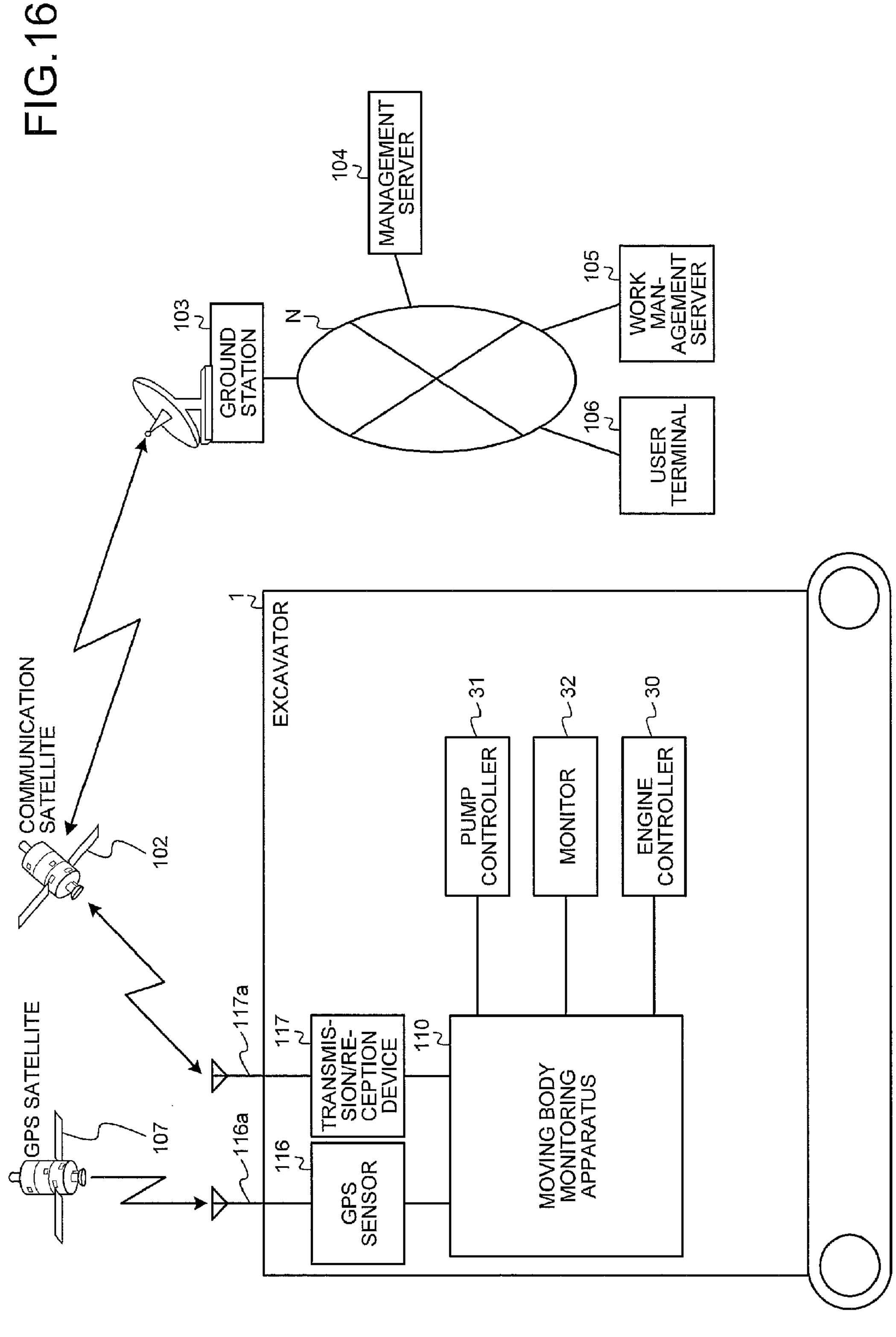
FIG. 16 is a view illustrating an outline configuration of a work management system including the excavator.

Also, the setting changing unit 71 can change various set values (parameter) necessary for determination of a series of excavation-loading work which values are, for example, the time integration values S1 to S4 or the integration starting pressure P1. The setting changing unit 71 can change various set values from the outside through the input/output unit 66 by using a communication apparatus which can perform wireless or wired communication. The transmission/reception device 117 such as what is illustrated in FIG. 16 can be used as the communication apparatus. When wired communication can be performed, the input/output unit 66 may function as a communication apparatus. That is, the transmission/reception device 117 or the input/output unit 66 functions as a work machine-side communication unit. Note that by using an input unit such as a switch provided to the display/setting unit 27 of the monitor 32, various set values can be changed through the input/output unit 66.

Note that the various set values can be set by teaching or statistical processing. For example, the setting changing unit 71 can change setting of various set values (parameter) such as the integration starting pressure P1 with respect to each work site or each operator by teaching. More specifically, an operation of bucket excavation is actually performed and an operation from an excavation starting posture of the bucket to an excavation ending posture thereof is performed. In the excavation starting posture, a predetermined memory button (not illustrated) is operated. Also, in the excavation ending posture, the predetermined memory button (not illustrated) is operated. Accordingly, a time integration value S1 of a pilot pressure in each operation generated during the operation of the memory button is acquired and the time integration value is used as a set value. This memory button may be provided on the operation levers 41 and 42 or on the monitor 32. Also, with respect to a different set value, setting can be performed by similar teaching.

On the other hand, when various set values are changed by statistical processing, the excavation-loading work is previously performed for the predetermined number of times. By using the result, data such as a predetermined operating angle of the excavation-loading mechanism or time integration values S1 to S4 of a pilot pressure during each operation is calculated statistically. Then, statistical processing such as calculation of an average value of these pieces of data may be performed and the acquired result may be used as a set value.

[Work Management System]

FIG. 16 is a view illustrating an outline configuration of a work management system including the excavator 1. In the work management system, a plurality of moving bodies such as excavators 1 is spread geographically and communication connection between each excavator 1 and a management server 104 is performed through a communication apparatus such as a communication satellite 102, a ground station 103, and a network N such as the Internet. To the network N, a work management server 105 which is a server of a manager of the excavator 1 and a user terminal 106 are connected. The user terminal 106 can access the management server 104 or the work management server 105. The excavator 1 transmits, to the management server 104, work information, which includes the above-described number of times of loading or basic excavation and loading time, and moving body information which is vehicle information including information indicating a work state such as positional information, operating time, traveling time, idling time, and vehicle identification information of the excavator 1, and identification information of an operator. The management server 104 transfers the above-described work information and moving body information to a corresponding work management server 105 of each manager.

The excavator 1 includes a moving body monitoring apparatus 110. The moving body monitoring apparatus 110 is connected to a GPS sensor 116 and the transmission/reception device 117. The GPS sensor 116 detects a self-position based on information transmitted from a plurality of GPS satellites 107 through an antenna 116*a* and generates self-position information. The moving body monitoring apparatus 110 acquires the self-position information. The transmission/reception device 117 is a work machine-side communication unit and communication connection to the communication satellite 102 is performed through an antenna 117*a*. Transmission/reception processing of information is performed between the moving body monitoring apparatus 110 and the management server 104.

Figures 1, 17:
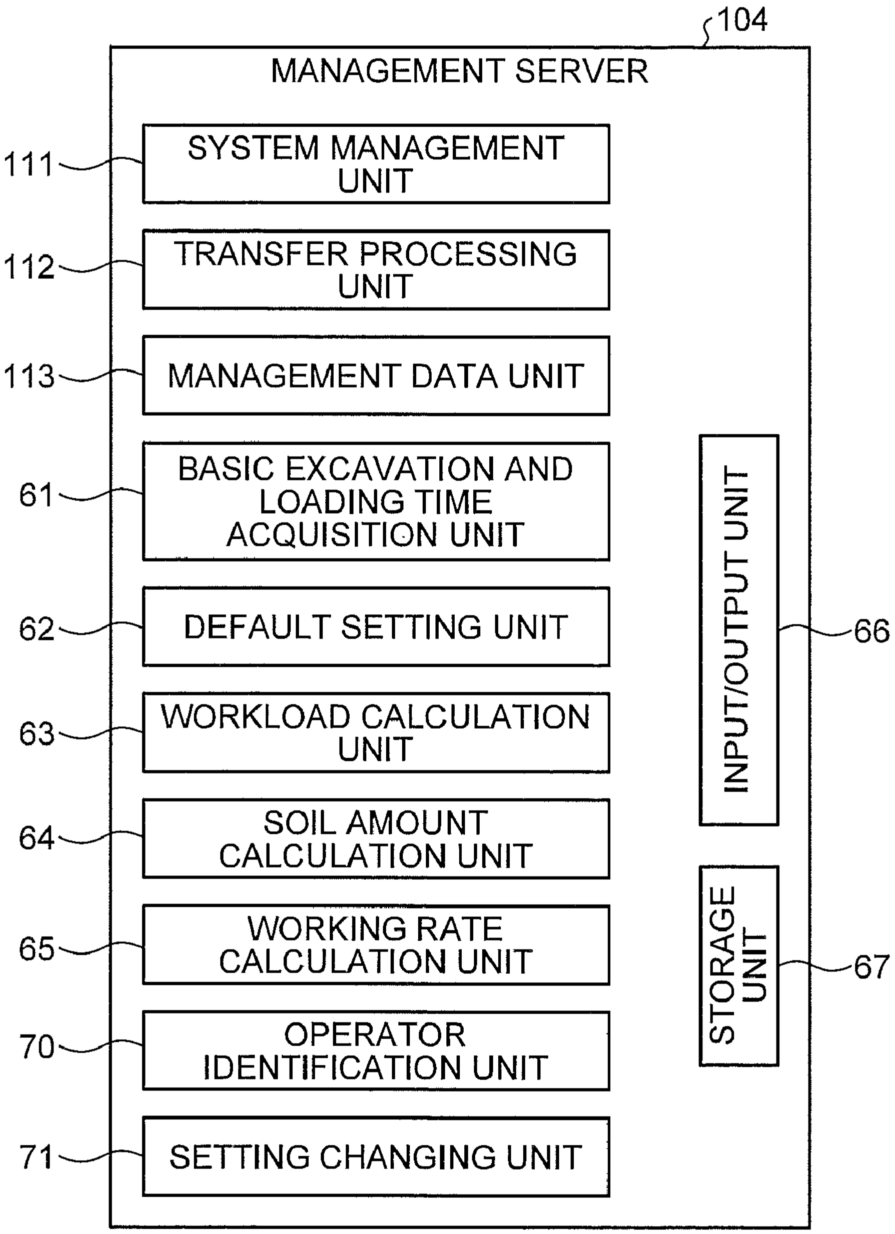
Figures 2, 17:
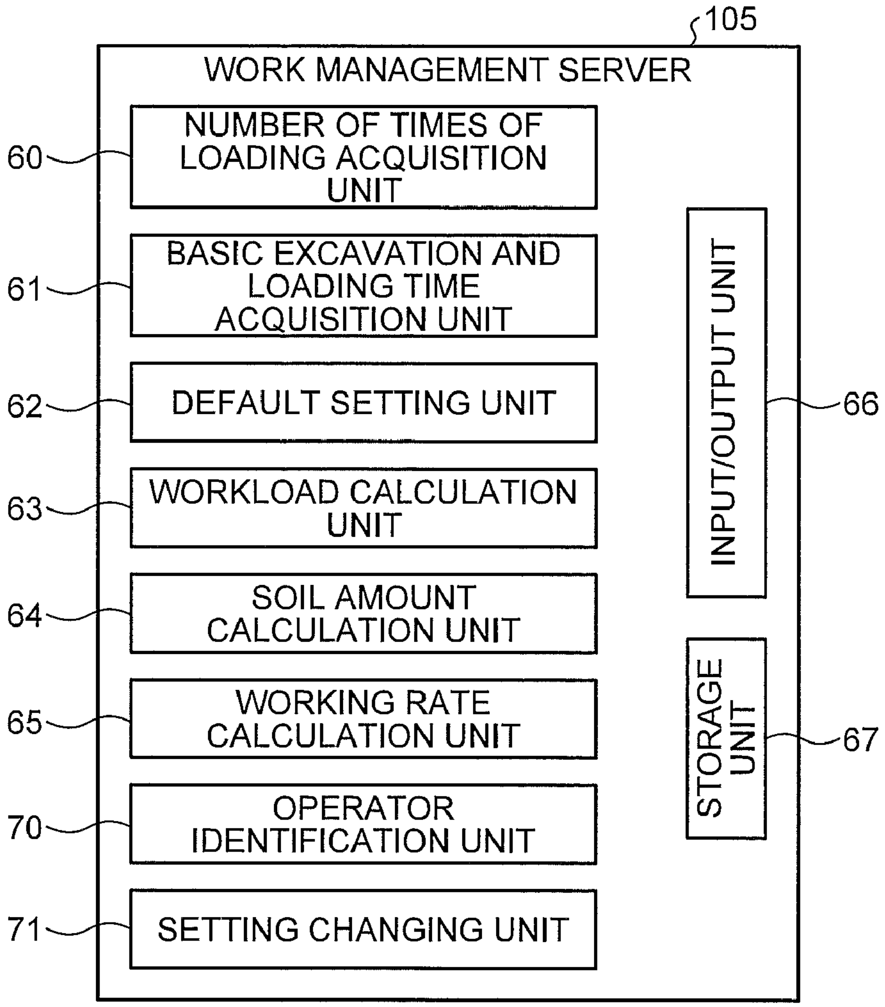

FIG. 17-1 is a block diagram illustrating an example of a configuration of the management server 104. As illustrated in FIG. 17-1, the management server 104 includes a system management unit 111 to manage the whole work management system, a transfer processing unit 112 to perform information transfer processing between the excavator 1 and the work management server 105, and a management data unit 113 to manage authentication information of the excavator 1 or the work management server 105. Also, the management server 104 may include a configuration, which is similar to that of the monitor 32, such as the number of times of loading acquisition unit 60. In this case, it is assumed that a user is a system in which direct access from the user terminal 106 to the management server 104 can be performed. Note that the input/output unit 66 of the management server 104 is a server-side communication unit and performs communication processing with the outside.

FIG. 17-2 is a block diagram illustrating an example of a configuration of the work management server 105. As illustrated in FIG. 17-2, the work management server 105 includes a configuration and function identical with those of the monitor 32. The input/output unit 66 of the work management server 105 is a server-side communication unit and performs communication processing with the outside. That is, the input/output unit 66 also corresponds to the user terminal 106. Thus, when the user terminal 106 accesses the work management server 105, work management similar to that with the monitor 32 can be performed and various kinds of work management in a wide range can be performed. That is, fleet management can be performed with respect to progress of work or efficiency of the work at a place away from a work site.

Figure 18:
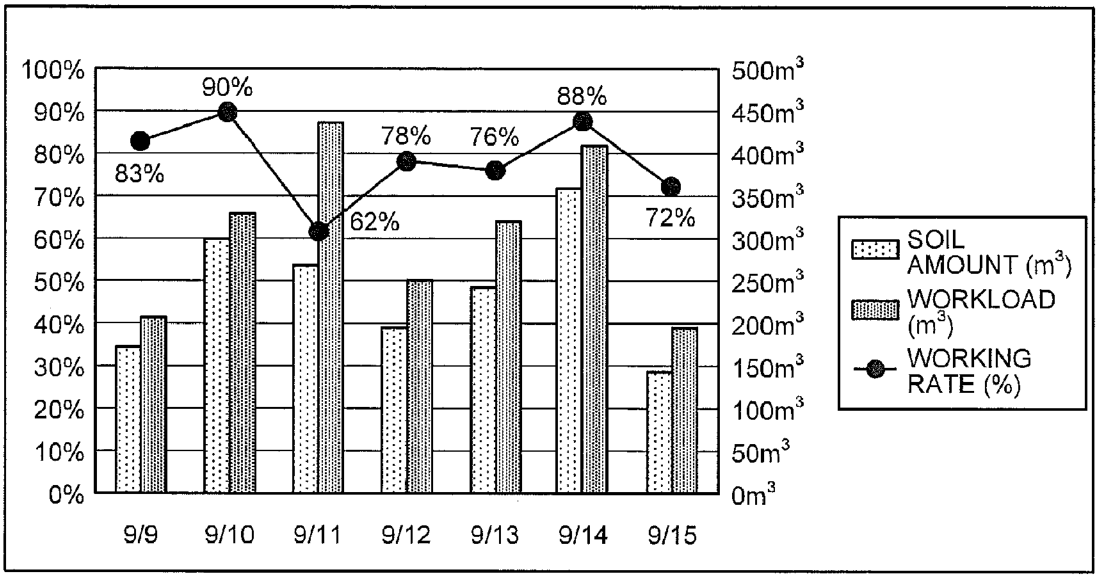
FIG. 18 is a view illustrating a display example of work management using the number of times of loading.

FIG. 18 is a view illustrating a display example of work management in which the number of times of loading is used. A date on which work is performed by the excavator 1 is indicated in a horizontal axis. On a left side of the vertical axis, a working rate is indicated and on a right side of the vertical axis, a soil amount and a workload are indicated. Here, the soil amount is an amount of soil carried out from a certain work site by the excavation-loading work. In FIG. 18, a soil amount on September 11 is small compared to a workload. With this, it can be assumed that work to gather and store surrounding soil in one place (feed gathering) is performed instead of the actual excavation-loading work and such work may be accumulated as a count number of the number of times of loading.

Note that a display output of a graph illustrated in FIG. 18 may be performed onto the user terminal 106 provided in an office or onto a mobile terminal of the user. Also, a display output onto the monitor 32 may be performed. Moreover, when a working rate is lower than a predetermined threshold, a percent numeric value of the working rate on the day may be displayed with a different color or a message may be displayed. Also, the graph illustrated in FIG. 18 may be created for each operator. In addition, the graph illustrated in FIG. 18 may be displayed for each construction site. Also, in the graph illustrated in FIG. 18, all (all of three kinds of data) may be line graphs. Moreover, in the graph illustrated in FIG. 18, all (all of three kinds of data) may be bar graphs. Also, the graph illustrated in FIG. 18 is an example illustrating a working rate or the like with respect to a certain excavator 1 and may be displayed for each of the plurality of excavators 1. In addition, as illustrated in the graph in FIG. 18, when a soil amount and a workload are illustrated in bar graphs, it is preferable that color coding is performed. Note that in the above description or in FIG. 18, a case where work management is performed by calculating a working rate by using the soil amount and the workload has been illustrated. However, the work management may be performed simply by using only the workload of each excavator 1. For example, by simply acquiring a value of a workload of each excavator 1 and performing comparison, it is possible to simply manage in which excavator 1 a load of the excavation-loading work is large. Also, with respect to a specific excavator 1, by comparing a daily work amount, it is possible to manage a state of work simply.

Note that it is not necessary to give a configuration and a function identical to those of the monitor 32 to the work management server 105 and the configuration and function illustrated in FIG. 14 may be kept included in the monitor 32. In this case, a setting change of various set values can be performed by intercommunication between the above-described work machine-side communication unit and server-side communication unit. The user terminal 106 can access the work management server 105 and can perform a setting change of various set values with respect to the setting changing unit 71 of the monitor 32 through the work management server 105 and the management server 104. Moreover, a part of the configuration and the function of the monitor 32 may be included on a side of the management server 104 or the work management server 105.

Also, the excavator 1 includes a satellite communication function but is not the limitation. For example, various communication functions such as a wireless LAN communication function and a mobile communication function may be included. That is, the excavator 1 includes an external communication function. Also, when it is not possible to perform wireless communication in a place in which infrastructure related to the wireless communication is not provided, a connector which can connect a wire for data communication may be provided to the excavator 1 as a configuration to achieve the external communication function with a wire. Work information and moving body information may be downloaded through the wire.

REFERENCE SIGNS LIST

1 excavator
2 vehicle body
3 work device
4 lower traveling body
5 upper swing body
11 boom
12 arm
13 bucket
14 boom cylinder
15 arm cylinder
16 bucket cylinder
17 engine
18 hydraulic pump
18*a* swash plate angle sensor
20 control valve
21 hydraulic traveling motor
22 swing hydraulic motor
27 display/setting unit
28 work mode switching unit
29 fuel adjustment dial
30 engine controller
31 pump controller
31*a* operation state detection unit
31*b* time integration unit
31*c* determination unit
31*d* counting unit
31*e* mode detection unit
31*f* traveling operation detection unit
31*g* swing lock detection unit
32 monitor
33 swing lock unit
41, 42 operation lever
43, 44 traveling lever
50 dump truck
55 pressure sensor
60 number of times of loading acquisition unit
61 basic excavation and loading time acquisition unit
62 default setting unit
63 workload calculation unit
64 soil amount calculation unit
65 working rate calculation unit
66 input/output unit
67 storage unit
70 operator identification unit
71 setting changing unit
80 fuel injection apparatus
102 communication satellite
103 ground station
104 management server
105 work management server
106 user terminal
107 GPS satellite
110 moving body monitoring apparatus
116 GPS sensor
116*a*, 117*a* antenna
117 transmission/reception device
N network
P1 integration starting pressure
S1 to S4 time integration value

The invention claimed is:

1. A work machine comprising:

a work state detection unit configured to detect a physical amount output in response to an operation of an operation lever;

a time integration unit configured to calculate a time integration value by performing time-integration of the physical amount;

a determination unit configured to associate the time integration value with a predetermined operating angle of an excavation-loading mechanism, the operation angle being associated with the operation of the operation lever and to determine that the operation of the operation lever is performed at a time the time integration value is not smaller than a predetermined integration value;

a counting unit configured to perform accumulation adding with number of times of loading as once at a time each operation, of the excavation-loading mechanism, determined by the determination unit is an excavation-loading work performed in an order of: an excavation operation; a forward swing operation; a soil discharge operation; and a backward swing operation;

a default setting unit configured to set a bucket capacity;

a workload calculation unit configured to calculate a workload by multiplying the number of times of loading by the bucket capacity; and an output unit configured to at least output the workload.

2. The work machine according to claim 1, wherein the default setting unit is configured to further set a default including number of a collectors and a payload of a collector, and the work machine further comprises:

a soil amount calculation unit configured to calculate a soil amount by multiplying the number of collectors by the payload of the collector;

a working rate calculation unit configured to calculate a working rate based on the workload and the soil amount; and an output unit configured to at least output the working rate.

3. The work machine according to claim 1, wherein the counting unit is configured to measure basic excavation and loading time which is time necessary for a series of excavation-loading work on which time accumulation adding is performed, and the output unit is configured to output operation time of the work machine including the basic excavation and loading time.

4. The work machine according to claim 1, wherein the output unit is configured to output the number of times of loading.

5. The work machine according to claim 1, further comprising a setting changing unit configured to change various set values necessary for determination of the series of excavation-loading work, wherein the setting changing unit can change various set values.

6. The work machine according to claim 5, wherein various set values are values previously calculated by a teaching operation.

7. The work machine according to claim 1, further comprising an operator identification unit configured to perform individual authentication of an operator, and a storage unit configured to associate operator identification information with number of times of loading of each operator and store the operator identification information associated with the number of times of loading of each operator.

8. The work machine according to claim 1, wherein the operation lever is a pilot type or an electric type, and the physical amount is a pilot pressure or an electric signal.

9. A work management system comprising:

at least one work machine including:

a work state detection unit configured to detect a physical amount output in response to an operation of an operation lever;

a time integration unit configured to calculate a time integration value by performing time-integration of the physical amount;

a determination unit configured to associate the time integration value with a predetermined operating angle of an excavation-loading mechanism, the operation angle being associated with the operation of the operation lever and to determine that the operation of the operation lever is performed at a time the time integration value is not smaller than a predetermined integration value;

a counting unit configured to perform accumulation adding with number of times of loading as once at a time each operation, of the excavation-loading mechanism, determined by the determination unit is an excavation-loading work performed in an order of: an excavation operation; a forward swing operation; a soil discharge operation; and a backward swing operation and also configured to measure basic excavation and loading time which is time necessary for a series of excavation-loading work on which time accumulation adding is performed; and a work machine-side communication unit configured to communicate with a server side and to at least output the number of times of loading and the basic excavation and loading time; and a server including:

a default setting unit configured to set a bucket capacity;

a workload calculation unit configured to calculate a workload by multiplying the number of times of loading by the bucket capacity;

an output unit configured to at least perform a display output of the workload; and a server-side communication unit configured to communicate with the at least one work machine.

10. The work management system according to claim 9, wherein the default setting unit is configured to further set a default including number of collectors and a payload of a collector, and the work management system further comprises:

a soil amount calculation unit configured to calculate a soil amount by multiplying the number of collectors by the payload of the collector;

a working rate calculation unit configured to calculate a working rate based on the workload and the soil amount; and an output unit configured to at least perform a display output of the working rate.

11. The work management system according to claim 10, wherein the working rate calculated by the working rate calculation unit is displayed on a display apparatus of a terminal which can access the server, and at least one of a daily working rate of a specific work machine, a working rate of each operator, a working rate of each of a plurality of work machines, and a working rate of each construction site is displayed as the working rate.

12. The work management system according to claim 9, wherein the basic excavation and loading time output from the work machine-side communication unit with respect to at least one of a specific work machine in each day, each operator, each of a plurality of work machines, and each construction site is displayed on a display apparatus of a terminal which can access the server.

* * * * *